United States Patent
Wang et al.

(10) Patent No.: US 11,804,877 B2
(45) Date of Patent: Oct. 31, 2023

(54) ENHANCED BEAM SEARCHING FOR ACTIVE COORDINATION SETS

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 468 days.

(21) Appl. No.: 17/275,632

(22) PCT Filed: Sep. 19, 2019

(86) PCT No.: PCT/US2019/051980
§ 371 (c)(1),
(2) Date: Mar. 11, 2021

(87) PCT Pub. No.: WO2021/054963
PCT Pub. Date: Mar. 25, 2021

(65) Prior Publication Data
US 2021/0391897 A1    Dec. 16, 2021

(51) Int. Cl.
*H04B 7/024* (2017.01)
*H04B 7/06* (2006.01)

(52) U.S. Cl.
CPC .......... *H04B 7/024* (2013.01); *H04B 7/0695* (2013.01)

(58) Field of Classification Search
None
See application file for complete search history.

(56) References Cited

U.S. PATENT DOCUMENTS 6,038,448 A     3/2000   Chheda et al.
6,665,521 B1   12/2003   Gorday et al.
(Continued)

FOREIGN PATENT DOCUMENTS

CN   101764634   6/2010
CN   101867451  10/2010
(Continued)

OTHER PUBLICATIONS

Buzzi, et al., "RIS Configuration, Beamformer Design, and Power Control in Single-Cell and Multi-Cell Wireless Networks", Jun. 2021, pp. 398-411.
(Continued)

*Primary Examiner* — Eunsook Choi
(74) *Attorney, Agent, or Firm* — Colby Nipper PLLC

(57) ABSTRACT

This document describes methods, devices, systems, and means for enhanced beam searching for an active coordination set. A user equipment (110) receives an active-coordination-set beam-sweep (602) including multiple time slots (610), each of the multiple time slots including one or more candidate beams. The user equipment (110) determines a respective link-quality metric for each of the received one or more candidate beams in each of the time slots. Based on the link-quality metrics, the user equipment (110) selects the one or more candidate beams in a time slot (610) to use for wireless communication. The user equipment (110) transmits a beam-acquired indication (620) at a first time offset (604) after the time slot (610) in which the selected one or more candidate beams are received, the transmitting directing the base stations (120) to use the selected one or more candidate beams for the wireless communication.

20 Claims, 10 Drawing Sheets

(56) References Cited

U.S. PATENT DOCUMENTS

| | | |
|---|---|---|
| 6,898,430 B1 | 5/2005 | Liberti et al. |
| 8,023,463 B2 | 9/2011 | Dick et al. |
| 8,315,629 B2 | 11/2012 | Pamp et al. |
| 8,483,184 B2 | 7/2013 | Yokoyama et al. |
| 8,665,806 B2 | 3/2014 | Wang et al. |
| 8,706,156 B2 | 4/2014 | Han et al. |
| 9,008,678 B2 | 4/2015 | Schoenerstedt |
| 9,100,095 B2 | 8/2015 | Mantri |
| 9,210,550 B2 | 12/2015 | Koc et al. |
| 9,253,783 B2 | 2/2016 | Wang et al. |
| 9,344,159 B2 | 5/2016 | Zhuang |
| 9,374,772 B2 | 6/2016 | Daoud |
| 9,380,533 B2 | 6/2016 | Chung et al. |
| 9,674,863 B2 | 6/2017 | Cheng et al. |
| 9,743,329 B2 * | 8/2017 | Xiao ............... H04B 7/24 |
| 9,780,842 B2 | 10/2017 | Boudreau et al. |
| 9,941,939 B2 | 4/2018 | Parl et al. |
| 9,985,750 B2 | 5/2018 | Maaref et al. |
| 10,045,376 B2 | 8/2018 | Yang et al. |
| 10,218,422 B2 | 2/2019 | Raghavan et al. |
| 10,412,691 B1 | 9/2019 | Marupaduga et al. |
| 10,476,577 B1 | 11/2019 | Wang et al. |
| 10,834,645 B2 | 11/2020 | Wang et al. |
| 10,893,572 B2 | 1/2021 | Wang et al. |
| 11,224,081 B2 | 1/2022 | Wang et al. |
| 11,375,527 B1 * | 6/2022 | Eyuboglu ......... H04B 7/15528 |
| 2003/0002460 A1 | 1/2003 | English |
| 2004/0203973 A1 | 10/2004 | Khan |
| 2006/0013185 A1 | 1/2006 | Seo et al. |
| 2006/0116156 A1 | 6/2006 | Haseba et al. |
| 2006/0128312 A1 | 6/2006 | Declerck et al. |
| 2006/0203731 A1 | 9/2006 | Tiedemann et al. |
| 2010/0027487 A1 | 2/2010 | Ihm et al. |
| 2010/0103983 A1 | 4/2010 | Wang et al. |
| 2010/0142462 A1 | 6/2010 | Wang et al. |
| 2010/0173660 A1 | 7/2010 | Liu et al. |
| 2010/0210246 A1 | 8/2010 | Yang et al. |
| 2011/0080893 A1 | 4/2011 | Fong et al. |
| 2011/0096751 A1 | 4/2011 | Ma et al. |
| 2011/0124294 A1 | 5/2011 | Dwyer et al. |
| 2011/0158117 A1 | 6/2011 | Ho et al. |
| 2011/0281585 A1 | 11/2011 | Kwon et al. |
| 2012/0033571 A1 * | 2/2012 | Shimezawa ......... H04J 11/0053 370/252 |
| 2012/0087273 A1 | 4/2012 | Koo et al. |
| 2012/0120821 A1 | 5/2012 | Kazmi et al. |
| 2012/0157139 A1 | 6/2012 | Noh et al. |
| 2012/0178462 A1 | 7/2012 | Kim |
| 2012/0218968 A1 | 8/2012 | Kim et al. |
| 2012/0264443 A1 | 10/2012 | Ng et al. |
| 2013/0034136 A1 | 2/2013 | Park et al. |
| 2013/0053045 A1 | 2/2013 | Chuang |
| 2013/0053079 A1 | 2/2013 | Kwun et al. |
| 2013/0089058 A1 | 4/2013 | Yang et al. |
| 2013/0107848 A1 | 5/2013 | Kang et al. |
| 2013/0130684 A1 | 5/2013 | Gomes et al. |
| 2013/0150106 A1 | 6/2013 | Bucknell et al. |
| 2013/0182628 A1 | 7/2013 | Gholmieh et al. |
| 2013/0225184 A1 | 8/2013 | Liu et al. |
| 2013/0242787 A1 | 9/2013 | Sun et al. |
| 2013/0244682 A1 | 9/2013 | Schoenerstedt |
| 2014/0010131 A1 | 1/2014 | Gaal et al. |
| 2014/0112184 A1 | 4/2014 | Chai |
| 2014/0127991 A1 | 5/2014 | Lim et al. |
| 2014/0148168 A1 | 5/2014 | Aoyagi et al. |
| 2014/0169201 A1 | 6/2014 | Tamura et al. |
| 2014/0169261 A1 | 6/2014 | Ming et al. |
| 2014/0274081 A1 | 9/2014 | Comeau et al. |
| 2014/0287759 A1 | 9/2014 | Purohit |
| 2014/0348104 A1 | 11/2014 | Morita |
| 2014/0376478 A1 | 12/2014 | Morita |
| 2015/0098397 A1 | 4/2015 | Damnjanovic et al. |
| 2015/0139197 A1 | 5/2015 | He et al. |
| 2015/0139203 A1 | 5/2015 | Miryala et al. |
| 2015/0163822 A1 | 6/2015 | Guo et al. |
| 2015/0195795 A1 | 7/2015 | Loehr et al. |
| 2015/0244489 A1 | 8/2015 | Wang |
| 2015/0288427 A1 | 10/2015 | Wang et al. |
| 2015/0326282 A1 | 11/2015 | Futaki |
| 2015/0373730 A1 | 12/2015 | Fujishiro et al. |
| 2016/0021526 A1 | 1/2016 | Niu et al. |
| 2016/0028448 A1 | 1/2016 | Park et al. |
| 2016/0037511 A1 * | 2/2016 | Vincze ............... H04W 72/27 370/329 |
| 2016/0044634 A1 | 2/2016 | Seo et al. |
| 2016/0128123 A1 | 5/2016 | Li |
| 2016/0174278 A1 | 6/2016 | Gao et al. |
| 2016/0192420 A1 | 6/2016 | Kim et al. |
| 2016/0192433 A1 | 6/2016 | Deenoo et al. |
| 2016/0219475 A1 | 7/2016 | Kim |
| 2016/0323832 A1 | 11/2016 | Love et al. |
| 2017/0070931 A1 | 3/2017 | Huang et al. |
| 2017/0078333 A1 | 3/2017 | Tevlin |
| 2017/0105147 A1 | 4/2017 | Jiang et al. |
| 2017/0164252 A1 | 6/2017 | Chaudhuri et al. |
| 2017/0188406 A1 | 6/2017 | Baligh et al. |
| 2017/0230986 A1 | 8/2017 | Moon et al. |
| 2017/0250786 A1 | 8/2017 | Better et al. |
| 2017/0332389 A1 | 11/2017 | Sun et al. |
| 2017/0339530 A1 | 11/2017 | Maaref |
| 2017/0347277 A1 | 11/2017 | Zhang et al. |
| 2017/0359759 A1 | 12/2017 | Brown et al. |
| 2018/0152951 A1 | 5/2018 | Zhuang et al. |
| 2018/0213450 A1 | 7/2018 | Futaki et al. |
| 2018/0220403 A1 | 8/2018 | Wilson et al. |
| 2018/0235020 A1 | 8/2018 | Maaref |
| 2018/0352511 A1 | 12/2018 | Martin et al. |
| 2019/0028348 A1 | 1/2019 | Chai |
| 2019/0053235 A1 | 2/2019 | Novlan et al. |
| 2019/0075604 A1 | 3/2019 | Wang et al. |
| 2019/0081657 A1 | 3/2019 | Zeng et al. |
| 2019/0082331 A1 | 3/2019 | Raghavan et al. |
| 2019/0165843 A1 | 5/2019 | Wu et al. |
| 2019/0174346 A1 | 6/2019 | Murray et al. |
| 2019/0174472 A1 | 6/2019 | Lee et al. |
| 2019/0253106 A1 | 8/2019 | Raghavan et al. |
| 2019/0312616 A1 | 10/2019 | Christoffersson et al. |
| 2020/0015192 A1 | 1/2020 | Chun |
| 2020/0154442 A1 | 5/2020 | Zhou |
| 2020/0178131 A1 | 6/2020 | Wang et al. |
| 2020/0187281 A1 | 6/2020 | Wang et al. |
| 2020/0220603 A1 | 7/2020 | Hao et al. |
| 2020/0374970 A1 | 11/2020 | Wang et al. |
| 2021/0029516 A1 | 1/2021 | Wang et al. |
| 2021/0068123 A1 * | 3/2021 | Zhu ............... H04B 7/0814 |
| 2021/0385903 A1 | 12/2021 | Wang et al. |
| 2022/0007363 A1 | 1/2022 | Wang et al. |
| 2022/0030414 A1 | 1/2022 | Wang et al. |
| 2022/0110181 A1 * | 4/2022 | Miao ............... H04L 1/1822 |
| 2022/0311577 A1 * | 9/2022 | Matsumura ......... H04L 5/0032 |

FOREIGN PATENT DOCUMENTS

| | | |
|---|---|---|
| CN | 102474743 | 5/2012 |
| CN | 104067660 | 9/2014 |
| CN | 107736048 | 2/2018 |
| CN | 107872889 | 4/2018 |
| EP | 2282413 | 2/2011 |
| EP | 2809104 | 12/2014 |
| EP | 2953393 | 12/2015 |
| EP | 3282786 | 2/2018 |
| EP | 3701638 | 9/2020 |
| WO | 0237771 | 5/2002 |
| WO | 2008147654 | 12/2008 |
| WO | 2012114151 | 8/2012 |
| WO | 2013091229 | 6/2013 |
| WO | 2014074919 | 5/2014 |
| WO | 2014179958 | 11/2014 |
| WO | 2015074270 | 5/2015 |
| WO | 2015163798 | 10/2015 |
| WO | 2016081375 | 5/2016 |
| WO | 2016191091 | 12/2016 |
| WO | 2017117340 | 7/2017 |
| WO | 2017148173 | 9/2017 |

(56) References Cited

FOREIGN PATENT DOCUMENTS

| | | |
|---|---|---|
| WO | 2018010818 | 1/2018 |
| WO | 2018020015 | 2/2018 |
| WO | 2018031770 | 2/2018 |
| WO | 2018073485 | 4/2018 |
| WO | 2018130115 | 7/2018 |
| WO | 2018169343 | 9/2018 |
| WO | 2018202797 | 11/2018 |
| WO | 2018202798 | 11/2018 |
| WO | 2019001039 | 1/2019 |
| WO | 2019016141 | 1/2019 |
| WO | 2019038700 | 2/2019 |
| WO | 2018025789 | 5/2019 |
| WO | 2020112680 | 6/2020 |
| WO | 2020113010 | 6/2020 |
| WO | 2020117558 | 6/2020 |
| WO | 2020139811 | 7/2020 |
| WO | 2020142532 | 7/2020 |
| WO | 2020159773 | 8/2020 |
| WO | 2020172022 | 8/2020 |
| WO | 2020172372 | 8/2020 |
| WO | 2020186097 | 9/2020 |
| WO | 2020236429 | 11/2020 |
| WO | 2021015774 | 1/2021 |
| WO | 2021029879 | 2/2021 |
| WO | 2021054964 | 3/2021 |
| WO | 2021236510 | 11/2021 |
| WO | 2022133957 | 6/2022 |
| WO | 2022151128 | 7/2022 |
| WO | 2022186815 | 9/2022 |
| WO | 2023115058 | 6/2023 |

OTHER PUBLICATIONS

Mustaghfirin, et al., "Performance Analysis of Intelligent Reflecting Surface-Assisted Multi-Users Communication Networks", Aug. 2021, 16 pages.

Yifei, et al., "Recent Progress in Research and Development of Reconfigurable Intelligent Surface", Mar. 2022, 11 pages.

"Extended European Search Report", EP Application No. 22194393.9, dated Jan. 26, 2023, 6 pages.

"Foreign Office Action", EP Application No. 19845895.2, dated Dec. 13, 2022, 7 pages.

"International Search Report and Written Opinion", Application No. PCT/US2022/081918, dated Jun. 20, 2023, 20 pages.

"Invitation to Pay Additional Fees and Partial Search Report", Application No. PCT/US2022/081918, dated Apr. 19, 2023, 12 pages.

Hua, Meng , et al., "Intelligent Reflecting Surface-Aided Joint Processing Coordinated Multipoint Transmission", Dec. 3, 2020, 16 pages.

Nemati, Mahyar , "Modeling RIS Empowered Outdoor-to-Indoor Communication in mmWave Cellular Networks", Nov. 2021, 14 pages.

"3GPP TSG RAN WG4 25.942 V2.0.0: "RF System Scenarios"", TSG RAN Working Group 4 (Radio) Meeting #8, Oct. 1999, 65 pages.

"International Preliminary Report on Patentability", Application No. PCT/US2019/069129, dated Apr. 7, 2021, 14 pages.

"Foreign Office Action", IN Application No. 202147024718, dated Feb. 28, 2022, 5 pages.

"Foreign Office Action", IN Application No. 202147017729, dated Mar. 9, 2022, 6 pages.

"International Preliminary Report on Patentability", Application No. PCT/US2019/063081, dated May 25, 2021, 9 pages.

"International Preliminary Report on Patentability", Application No. PCT/US2020/014638, dated Jul. 27, 2021, 7 pages.

"Non-Final Office Action", U.S. Appl. No. 16/210,969, dated Jun. 24, 2021, 19 pages.

"5G; Study on New Radio (NR) Access Technology", ETSI TR 138 912; V14.0.0; Technical Report; 3GPP TR 38.912 version 14.0.0 Release 14, May 2017, 77 pages.

"Beam Management and Beam Reporting", 3GPP TSG RAN WG1 Meeting #88bis, R1-1704488, Spokane, Washington, USA Apr. 3-7, 2017, 7 pages.

"Discussion on HARQ Management and HARQ-ACK Feedback", 3GPP TSG RAN WG1 Meeting #91, R1-1720203, Reno, USA, Nov. 27-Dec. 1, 2017, 5 pages.

"Final Office Action", U.S. Appl. No. 16/210,969, dated Jan. 7, 2021, 17 pages.

"International Preliminary Report on Patentability", Application No. PCT/US2019/063240, dated Feb. 18, 2021, 8 pages.

"International Preliminary Report on Patentability", Application No. PCT/US2019/051980, dated Dec. 8, 2020, 7 pages.

"International Search Report and Written Opiniion", Application No. PCT/US2019/051980, dated Jul. 27, 2020, 19 pages.

"International Search Report and Written Opinion", PCT Application No. PCT/US2019/063240, dated Feb. 13, 2020, 16 pages.

"International Search Report and Written Opinion", PCT Application No. PCT/US2019/063081, dated Feb. 21, 2020, 14 pages.

"International Search Report and Written Opinion", PCT Application No. PCT/US2019/069129, dated Mar. 31, 2020, 13 pages.

"International Search Report and Written Opinion", PCT Application No. PCT/US2020/014638, dated May 13, 2020, 12 pages.

"Invitation to Pay Additional Fees", PCT Application No. PCT/US2019/051980, dated Jun. 4, 2020, 10 pages.

"LTE; Evolved Universal Terrestrial Radio Access (E-UTRA) and Evolved Universal Terrestrial Radio Access Network (E-UTRAN); Overall Description; Stage 2 (3GPP TS 36.300 version 15.3.0 Release 15)", ETSI TS 136 300 V15.3.0, Oct. 2018, 366 pages.

"Non-Final Office Action", U.S. Appl. No. 16/206,579, dated Apr. 1, 2020, 23 Pages.

"Non-Final Office Action", U.S. Appl. No. 16/210,969, dated Jul. 23, 2020, 15 Pages.

"Notice of Allowance", U.S. Appl. No. 16/206,579, dated Jul. 8, 2020, 10 Pages.

"On the Need for More Flexible Configurations Related to CSI Reporting", 3GPP TSG RAN WG1 Meeting #87, R1-1611237, Reno, USA, Nov. 14-18, 2016, 6 pages.

"Supplemental Notice of Allowance", U.S. Appl. No. 16/206,579, dated Sep. 30, 2020, 3 pages.

"Universal Mobile Telecommunications System (UMTS); Automatic Neighbour Relation (ANR) for UTRAN", 3GPP TS 25.484 version 10.0.1 Release 10, Jan. 2012, 21 pages.

"Universal Mobile Telecommunications System (UMTS); Automatic Neighbour Relation (ANR) for UTRAN", 3GPP TS 25.484 version 11.0.0 Release 11, Jan. 2012, 22 pages.

"Written Opinion", Application No. PCT/US2019/063240, dated Oct. 27, 2020, 10 pages.

"Written Opinion", Application No. PCT/US2020/014638, dated Nov. 26, 2020, 5 pages.

"Written Opinion", PCT Application No. PCT/US2019/069129, dated Dec. 14, 2020, 7 pages.

Gorcin, et al., "Hybrid Automatic Neighbor Relations for 5G Wireless Networks", 2017, 6 pages.

Zhang, et al., "PoC of SCMA-Based Uplink Grant-Free Transmission in UCNC for 5G", IEEE Journal on Selected Areas in Communications, vol. 35, No. 6, Jun. 2017, 10 pages.

"3GPP TS 24.501 V16.3.0", 3GPP TS 24.501 version 16.3.0, Dec. 2019, 645 pages.

"3rd Generation Partnership Project; Technical Specification Group Services and System Aspects; Security architecture and procedures for 5G system", 3GPP TS 33.501 version 16.1.0 Release 16, Dec. 2019, 202 pages.

"5G; Non-Access-Stratum (NAS) protocol for 5G System (5GS); Stage 3", 3GPP TS 24.501 version 15.1.0 Release 15, Oct. 2018, 406 pages.

Zhang, et al., "Grant-less Uplink Transmission for LTE Operated in Unlicensed Spectrum", Feb. 14, 2018, 6 pages.

"Discussion on NR Beamforming with UE-Group-Specific Beam Sweeping", 3GPP TSG-RAN WG1 Meeting #86 R1-166219, Aug. 22, 2016, 7 pages.

"Foreign Office Action", CN Application No. 201980069427.8, Oct. 18, 2021, 12 pages.

(56) References Cited

OTHER PUBLICATIONS

"International Preliminary Report on Patentability", Application No. PCT/US2019/068265, dated Jan. 18, 2021, 20 pages.
"International Preliminary Report on Patentability", Application No. PCT/US2019/063620, dated May 25, 2021, 8 pages.
"International Preliminary Report on Patentability", Application No. PCT/US2019/068265, dated Jan. 18, 2021, 31 pages.
"International Search Report and Written Opinion", Application No. PCT/US2020/031716, dated Jul. 20, 2020, 14 pages.
"International Search Report and Written Opinion", Application No. PCT/US2020/045777, dated Oct. 9, 2020, 13 pages.
"International Search Report and Written Opinion", Application No. PCT/US2019/043355, dated Mar. 31, 2020, 12 pages.
"International Search Report and Written Opinion", Application No. PCT/US2019/063620, dated Mar. 9, 2020, 14 pages.
"International Search Report and Written Opinion", Application No. PCT/US2019/046374, dated Apr. 14, 2020, 13 pages.
"International Search Report and Written Opinion", Application No. PCT/US2019/068265, dated Apr. 29, 2020, 29 pages.
"International Search Report and Written Opinion", Application No. PCT/US2019/052005, dated May 18, 2020, 14 pages.
"International Search Report and Written Opinion", Application No. PCT/US2020/022460, dated May 26, 2020, 13 pages.
"International Search Report and Written Opinion", Application No. PCT/US2020/017930, dated May 29, 2020, 14 pages.
"Invitation to Pay Additional Fees", Application No. PCT/US2019/068265, dated Mar. 13, 2020, 13 pages.
"LTE; Evolved Universal Terrestrial Radio Access (E-UTRA); Medium Access Control (MAC) protocol specification (3GPP TS 36.321 version 15.8.0 Release 15)", ETSI TS 136 321 V15.8.0 (Jan. 2020), Jan. 2020, 137 pages.
"Non-Final Office Action", U.S. Appl. No. 16/419,854, dated Jun. 30, 2020, 29 Pages.
"Notice of Allowance", U.S. Appl. No. 16/210,969, dated Oct. 26, 2021, 5 pages.
"Notice of Allowance", U.S. Appl. No. 16/419,854, dated Nov. 5, 2020, 11 pages.
"Third Generation Partnership Project; Technical Specification Group Services and System Aspects; Service requirements for the 5G system; Stage 1", 3GPP TS 22.261 version 16.10.0 Release 16, Dec. 2019, 72 pages.
"UE Overheating for EN-DC", 3GPP R2-1802414, UE overheating for EN-DC, in 3GPP TSG-RAN WG2 Meeting #101, Apple Inc., Mar. 2, 2018, 3 pages.
"Written Opinion", Application No. PCT/US2020/031716, dated Mar. 25, 2021, 6 pages.
"Written Opinion", Application No. PCT/US2019/068265, dated Sep. 25, 2020, 20 pages.
Aboba, et al., "Extensible Authentication Protocol (EAP)", RFC Editor; Retrieved from https://www.rfc-editor.org/info/rfc3748, Jun. 2004, 67 pages.
Klingenbrunn, et al., "Power Backoff Mechanism for Intermodulation Distortion and Harmonic Distortion", Technical Disclosure Commons; Retrieved from https://www.tdcommons.org/dpubs_series/3424, Jul. 13, 2020, 13 pages.
Lin, et al., "Handling of Extensible Authentication Protocol Based Non-Access Stratum Authentication Failures", Technical Disclosure Commons; Retrieved from https://www.tdcommons.org/dpubs_series/3191, Apr. 23, 2020, 11 pages.
Son, "7 Deployment Scenarios of Private 5G Networks", Netmanias; Retrieved from https://www.netmanias.com/en/post/blog/14500/5g-edge-kt-sk-telecom/7-deployment-scenarios-of-private-5g-networks, Oct. 21, 2019, 11 pages.
Wu, "Handling Overheating in a Wireless-Communication Device", Technical Disclosure Commons; Retrieved from https://www.tdcommons.org/dpubs_series/2343, Jul. 12, 2019, 22 pages.
"Foreign Office Action", AU Application No. 20200216095, dated May 2, 2022, 7 pages.
"Foreign Office Action", IN Application No. 202147026024, dated Jun. 3, 2022, 7 pages.
"Foreign Office Action", IN Application No. 202247010266, dated Jul. 20, 2022, 7 pages.

\* cited by examiner

ENHANCED BEAM SEARCHING FOR ACTIVE COORDINATION SETS

BACKGROUND

An Active Coordination Set (ACS) of base stations provides and optimizes mobility management and other services to a user equipment (UE) in a radio access network (RAN). The ACS may be a component of, or used to implement, a user-centric no-cell (UCNC) network architecture. As a UE moves throughout the coverage provided by the RAN, the UE continually determines and updates, from its perspective, which base stations are usable for wireless communication.

The evolution of wireless communication systems to fifth generation (5G) New Radio (5G NR) and Sixth Generation (6G) technologies provides higher data rates to users. By employing techniques, such as Coordinated MultiPoint (CoMP) or Dual Connectivity (DC) over beamformed wireless connections within an ACS, still higher data rates can be provided at the edges of 5G and 6G cells. However, identifying a satisfactory beam for communication between a user equipment and the base stations in an ACS becomes increasingly complex at higher radio frequencies, which are more suspectable to blockage and for UEs experiencing rapidly changing radio-channel conditions.

SUMMARY

This summary is provided to introduce simplified concepts of enhanced beam searching for an active coordination set. The simplified concepts are further described below in the Detailed Description. This summary is not intended to identify essential features of the claimed subject matter, nor is it intended for use in determining the scope of the claimed subject matter.

In some aspects, a method for selecting a beam for wireless communication in an active coordination set by a user equipment is described in which the user equipment receives candidate beams of an active-coordination-set beam-sweep transmitted by base stations in the active coordination set, the active-coordination-set beam-sweep including multiple time slots, each of the multiple time slots including one or more candidate beams The base stations transmit multiple candidate beams over time slots, such as consecutive time slots so as to form the active-coordination-set beam sweep. The user equipment determines a respective link-quality metric for each of the received one or more candidate beams in each of the time slots, and based on the determined link-quality metrics, the user equipment selects the one or more candidate beams in a time slot to use for the wireless communication. The link-quality metric may be determined and the one or more candidate beams may be selected by the user equipment, or if alternative wireless communication is available the link-quality metric and selection of the one or more candidate beams may be determined by other network entities such as a base station or the core network. The user equipment transmits a beam-acquired indication at a first time offset after the time slot in which the selected one or more candidate beams is received, the transmitting being effective to direct the base stations to use the selected one or more candidate beams for the wireless communication. The first time offset is preferably a fixed time offset or a predetermined time offset. Such an offset may be used such that the base stations are configured at the time offset to receive the beam-acquired indication on the selected beam.

In another aspect, a method for selecting a beam for wireless communication in an active coordination set is described in which a base station negotiates parameters for an active-coordination-set beam-sweep with a user equipment. The base station negotiates the parameters for the active-coordination-set beam-sweep with other base stations in the active coordination set. Based on the negotiated parameters with the user equipment and the other base stations, the base station transmits one or more candidate beams of the active-coordination-set beam-sweep. The base station receives a beam-acquired indication from the user equipment at a first time offset after a particular candidate beam was transmitted in the active-coordination-set beam-sweep and, based on the received beam-acquired indication, communicates with the user equipment using a beam indicated by the beam-acquired indication. The first time offset is preferably a fixed time offset or a predetermined time offset. Such an offset may be used such that the base stations are configured at the time offset to receive the beam-acquired indication on the selected beam.

BRIEF DESCRIPTION OF THE DRAWINGS

Aspects of enhanced beam searching for an active coordination set are described with reference to the following drawings. The same numbers are used throughout the drawings to reference like features and components.

DETAILED DESCRIPTION

Figure 1:
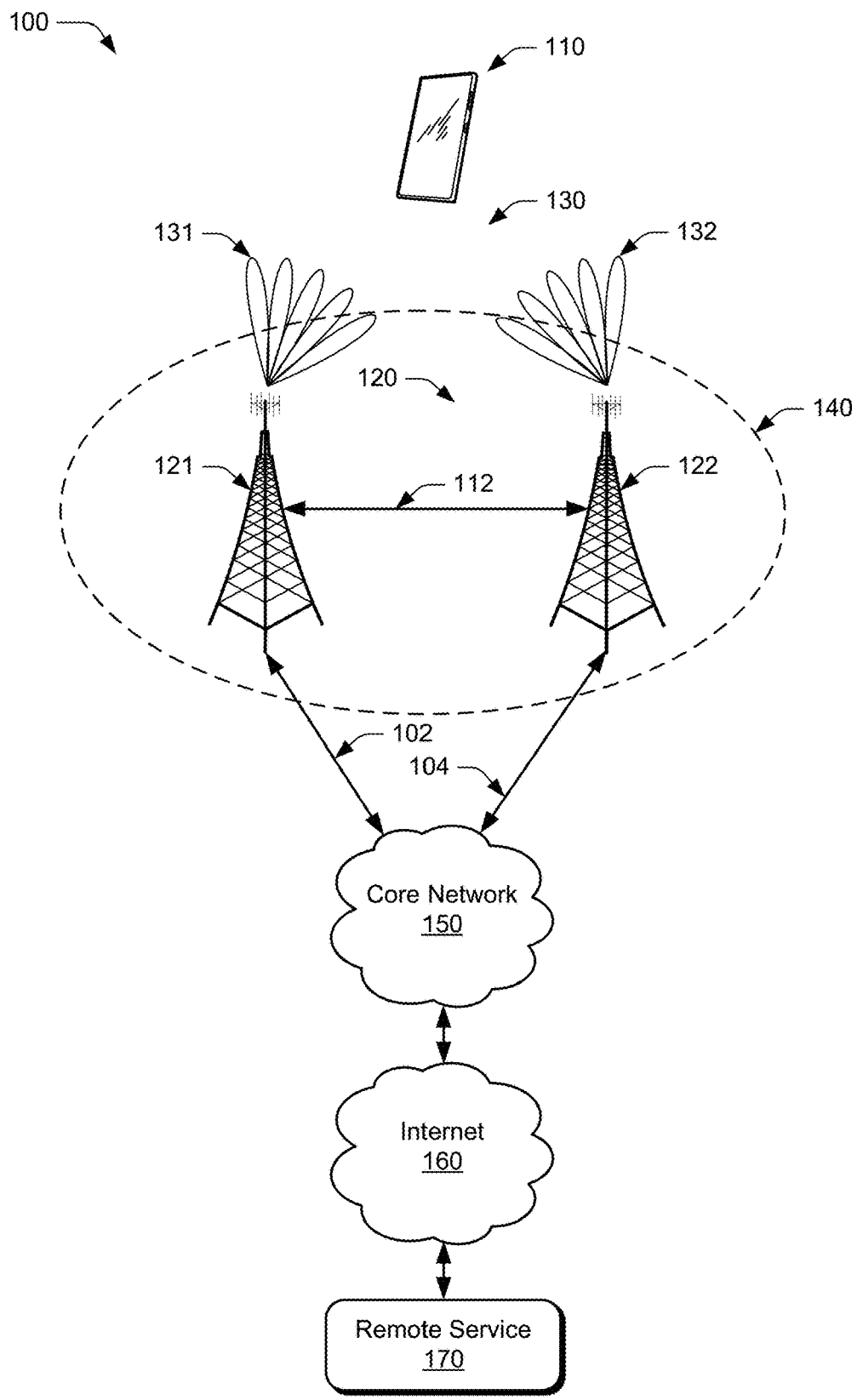
FIG. 1 illustrates an example wireless network system in which various aspects of enhanced beam searching for an active coordination set can be implemented.

This document describes methods, devices, systems, and means for enhanced beam searching for an active coordination set (ACS). A user equipment (UE) receives an active-coordination-set beam-sweep, including multiple time slots, each of the multiple time slots including one or more candidate beams. The user equipment determines a respective link-quality metric for each of the received one or more candidate beams in each of the time slots. Based on the link-quality metrics, the user equipment selects the one or more candidate beams in a time slot to use for wireless communication. The user equipment transmits a beam-acquired indication at a first time offset after the time slot in which the selected one or more candidate beams are received, the transmitting directing the base stations to use the selected one or more candidate beams for the wireless communication.

The evolution of wireless communication systems to fifth generation (5G) New Radio (5G NR) and Sixth Generation (6G) technologies provides higher data rates to users. By employing techniques, such as Coordinated MultiPoint (CoMP) or Dual Connectivity (DC) over beamformed wireless connections, even higher data rates can be provided at the edges of 5G and 6G cells. However, identifying a satisfactory beam for communication between a user equipment (UE) and the base stations in an ACS becomes increasingly complex at higher radio frequencies that are more suspectable to blockage and for UEs experiencing rapidly changing radio-channel conditions.

Conventional techniques for beam searches employ beam-sweeping during the attachment process of the UE with periodic beam-sweeping updates to identify a suitable beam for communication between a UE and a base station. These techniques are base-station-specific and do not fully account for the changing radio-channel environment of a user equipment communicating with multiple base stations in an ACS.

In aspects, enhanced beam searching for an active coordination set, the base stations in an ACS transmit an ACS beam-sweep on a downlink control channel. The ACS beam-sweep includes multiple time slots in which the base stations in the ACS transmit candidate beams.

One or more base stations in the ACS transmit each candidate beam in the ACS beam-sweep using a different beam. The UE attempts to decode each candidate beam of the ACS beam-sweep. When the UE decodes a candidate beam and determines that the candidate beam will be satisfactory for communication, the UE transmits a beam-acquired indication (BAI) in an uplink to the ACS. The UE transmits the BAI at a first time offset after the UE received the selected candidate beam. The BAI includes an identifier of the UE.

For downlink communication, base stations receiving the BAI use the UE identifier and the timing of the received BAI to determine which beam to use for a downlink data transmission and transmit the downlink data on a data channel at second time offset after the ACS receives the BAI. After receiving the downlink data, the UE transmits an acknowledgement to the ACS at a third time offset after the downlink data was received.

For uplink communication, the UE transmits a BAI with uplink data at the first time offset after the UE receives the selected candidate beam. The UE uses resources granted in a received resource grant to transmit the uplink data on the same physical channel or a different physical channel than the downlink control channel. After transmitting the uplink data, the ACS or a base station in the ACS transmits a downlink acknowledgement to the UE at a fourth time offset after the ACS receives the uplink data.

While features and concepts of the described devices, systems, and methods for enhanced beam searching for an active coordination set can be implemented in any number of different environments, systems, devices, and/or various configurations, aspects of enhanced beam searching for an active coordination set are described in the context of the following example devices, systems, and configurations.

Example Environment

FIG. 1 illustrates an example environment 100 in which various aspects of enhanced beam searching for an active coordination set can be implemented. The example environment 100 includes a user equipment 110 (UE 110) that communicates with one or more base stations 120 (illustrated as base stations 121 and 122), through one or more wireless communication links 130 (wireless link 130), illustrated as wireless links 131 and 132. In this example, the user equipment 110 is implemented as a smartphone. Although illustrated as a smartphone, the user equipment 110 may be implemented as any suitable computing or electronic device, such as a mobile communication device, a modem, cellular phone, gaming device, navigation device, media device, laptop computer, desktop computer, tablet computer, smart appliance, or vehicle-based communication system. The base stations 120 (e.g., an Evolved Universal Terrestrial Radio Access Network Node B, E-UTRAN Node B, evolved Node B, eNodeB, eNB, Next Generation Node B, gNode B, gNB, a 6G node B, or the like) may be implemented in a macrocell, microcell, small cell, picocell, and the like, or any combination thereof.

The base stations 120 communicate with the user equipment 110 via the wireless links 131 and 132, which may be implemented as any suitable type of wireless link. The wireless links 131 and 132 can include a downlink of data and control information communicated from the base stations 120 to the user equipment 110, an uplink of other data and control information communicated from the user equipment 110 to the base stations 120, or both. The wireless links 130 may include one or more wireless links or bearers implemented using any suitable communication protocol or standard, or combination of communication protocols or standards such as 3rd Generation Partnership Project Long-Term Evolution (3GPP LTE), Fifth Generation New Radio (5G NR), 6G, and so forth. Multiple wireless links 130 may be aggregated in a carrier aggregation to provide a higher data rate for the user equipment 110. Multiple wireless links 130 from multiple base stations 120 may be configured for Coordinated Multipoint (CoMP) communication with the user equipment 110. Additionally, multiple wireless links 130 may be configured for single-radio access technology (RAT) (single-RAT) dual connectivity (single-RAT-DC) or multi-RAT dual connectivity (MR-DC).

The base stations 120 are collectively a Radio Access Network 140 (RAN, Evolved Universal Terrestrial Radio Access Network, E-UTRAN, 5G NR RAN or NR RAN). The base stations 121 and 122 in the RAN 140 are connected to a core network 150, such as a Fifth Generation Core (5GC) or 6G core network. The base stations 121 and 122 connect, at 102 and 104 respectively, to the core network 150 via an NG2 interface (or a similar 6G interface) for control-plane signaling and via an NG3 interface (or a similar 6G interface) for user-plane data communications. In addition to connections to core networks, base stations 120 may communicate with each other via an Xn Application Protocol (XnAP), at 112, to exchange user-plane and control-plane data. The user equipment 110 may also connect, via the core network 150, to public networks, such as the Internet 160 to interact with a remote service 170.

Example Devices

Figure 2:
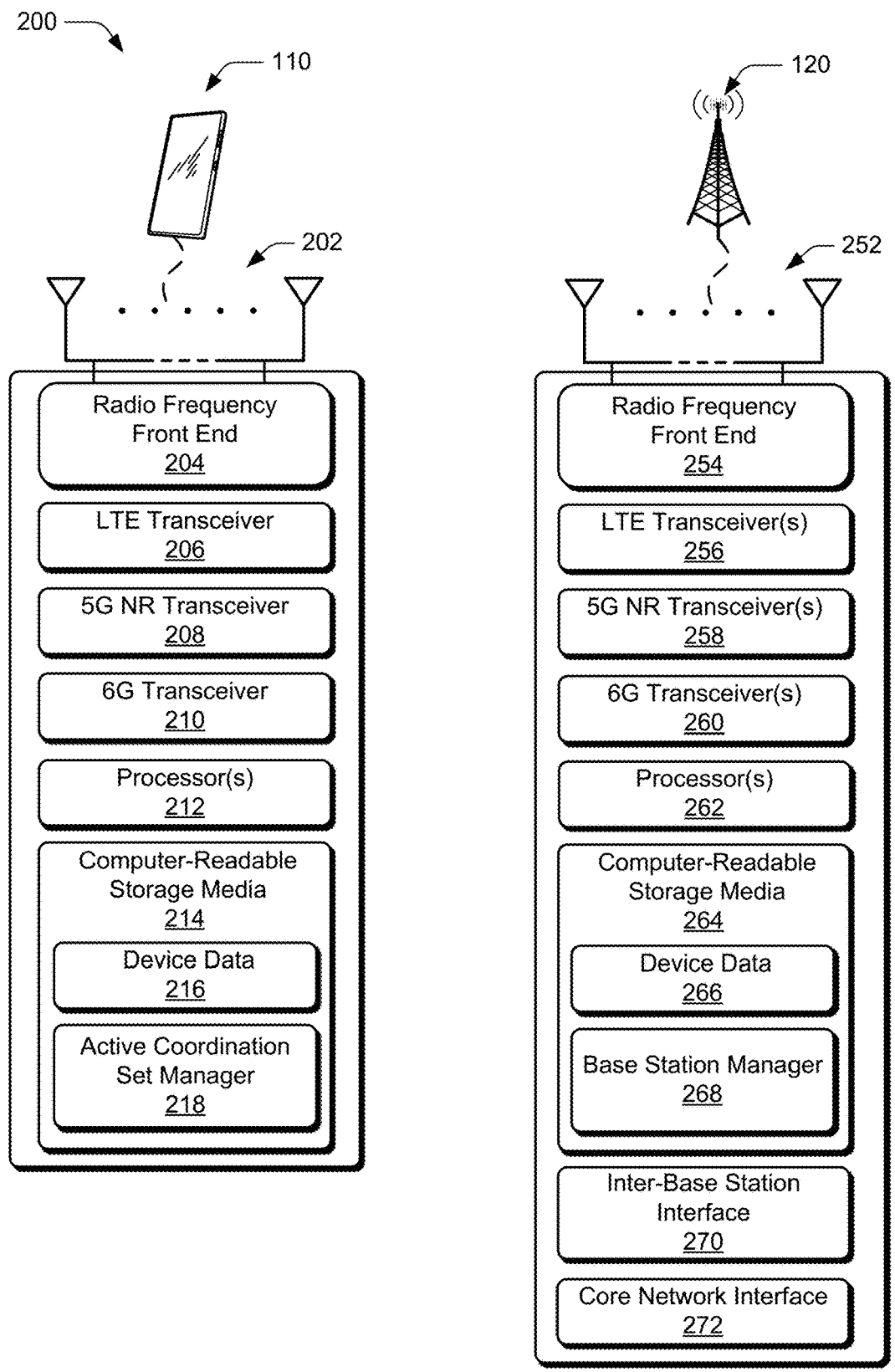
FIG. 2 illustrates an example device diagram that can implement various aspects of enhanced beam searching for an active coordination set.

FIG. 2 illustrates an example device diagram 200 of the user equipment 110 and the base stations 120. The user equipment 110 and the base stations 120 may include additional functions and interfaces that are omitted from FIG. 2 for the sake of clarity. The user equipment 110 includes antennas 202, a radio frequency front end 204 (RF front end 204), an LTE transceiver 206, a 5G NR transceiver 208, and a 6G transceiver 210 for communicating with base stations 120 in the RAN 140. The RF front end 204 of the user equipment 110 can couple or connect the LTE transceiver 206, the 5G NR transceiver 208, and the 6G transceiver 210 to the antennas 202 to facilitate various types of wireless communication. The antennas 202 of the user equipment 110 may include an array of multiple antennas that are configured similarly to or differently from each other. The antennas 202 and the RF front end 204 can be tuned to, and/or be tunable to, one or more frequency bands defined by the 3GPP LTE, 5G NR, and 6G communication standards and implemented by the LTE transceiver 206, the 5G NR transceiver 208, and/or the 6G transceiver 210. Additionally, the antennas 202, the RF front end 204, the LTE transceiver 206, the 5G NR transceiver 208, and/or the 6G transceiver 210 may be configured to support beamforming for the transmission and reception of communications with the base stations 120. By way of example and not limitation, the antennas 202 and the RF front end 204 can be implemented for operation in sub-gigahertz bands, sub-6 GHz bands, and/or above 6 GHz bands that are defined by the 3GPP LTE, 5G NR, and 6G communication standards.

The user equipment 110 also includes processor(s) 212 and computer-readable storage media 214 (CRM 214). The processor 212 may be a single core processor or a multiple core processor composed of a variety of materials, such as silicon, polysilicon, high-K dielectric, copper, and so on. The computer-readable storage media described herein excludes propagating signals. CRM 214 may include any suitable memory or storage device such as random-access memory (RAM), static RAM (SRAM), dynamic RAM (DRAM), non-volatile RAM (NVRAM), read-only memory (ROM), or Flash memory useable to store device data 216 of the user equipment 110. The device data 216 includes user data, multimedia data, beamforming codebooks, applications, and/or an operating system of the user equipment 110, which are executable by processor(s) 212 to enable user-plane communication, control-plane signaling, and user interaction with the user equipment 110.

In some implementations, the CRM 214 may also include an active coordination set (ACS) manager 218. The ACS manager 218 can communicate with the antennas 202, the RF front end 204, the LTE transceiver 206, the 5G NR transceiver 208, and/or the 6G transceiver 210 to monitor the quality of the wireless communication links 130. Based on this monitoring, the ACS manager 218 can determine to add or remove base stations 120 from the ACS and/or determine beams to use for communication with base stations.

The device diagram for the base stations 120, shown in FIG. 2, includes a single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256, one or more 5G NR transceivers 258, and/or one or more 6G transceivers 260 for communicating with the UE 110. The RF front end 254 of the base stations 120 can couple or connect the LTE transceivers 256, the 5G NR transceivers 258, and/or the 6G transceivers 260 to the antennas 252 to facilitate various types of wireless communication. The antennas 252 of the base stations 120 may include an array of multiple antennas that are configured similarly to or differently from each other. The antennas 252 and the RF front end 254 can be tuned to, and/or be tunable to, one or more frequency band defined by the 3GPP LTE, 5G NR, and 6G communication standards, and implemented by the LTE transceivers 256, one or more 5G NR transceivers 258, and/or one or more 6G transceivers 260. Additionally, the antennas 252, the RF front end 254, the LTE transceivers 256, one or more 5G NR transceivers 258, and/or one or more 6G transceivers 260 may be configured to support beamforming, such as Massive-MIMO, for the transmission and reception of communications with the UE 110.

The base stations 120 also include processor(s) 262 and computer-readable storage media 264 (CRM 264). The processor 262 may be a single core processor or a multiple core processor composed of a variety of materials, such as silicon, polysilicon, high-K dielectric, copper, and so on. CRM 264 may include any suitable memory or storage device such as random-access memory (RAM), static RAM (SRAM), dynamic RAM (DRAM), non-volatile RAM (NVRAM), read-only memory (ROM), or Flash memory useable to store device data 266 of the base stations 120. The device data 266 includes network scheduling data, radio resource management data, beamforming codebooks, applications, and/or an operating system of the base stations 120, which are executable by processor(s) 262 to enable communication with the user equipment 110.

CRM 264 also includes a base station manager 268. Alternately or additionally, the base station manager 268 may be implemented in whole or part as hardware logic or circuitry integrated with or separate from other components of the base stations 120. In at least some aspects, the base station manager 268 configures the LTE transceivers 256, the 5G NR transceivers 258, and the 6G transceiver(s) 260 for communication with the user equipment 110, as well as communication with a core network, such as the core network 150, and routing user-plane and control-plane data for joint communication. Additionally, the base station manager 268 may allocate air interface resources, schedule communications, and preform beam-sweeps for the UE 110 and base stations 120 in the ACS when the base station 120 is acting as a master base station for the base stations 120 in the ACS.

The base stations 120 include an inter-base station interface 270, such as an Xn and/or X2 interface, which the base station manager 268 configures to exchange user-plane and control-plane data between other base stations 120, to manage the communication of the base stations 120 with the user equipment 110. The base stations 120 include a core network interface 272 that the base station manager 268 configures to exchange user-plane and control-plane data with core network functions and/or entities.

Figure 3:
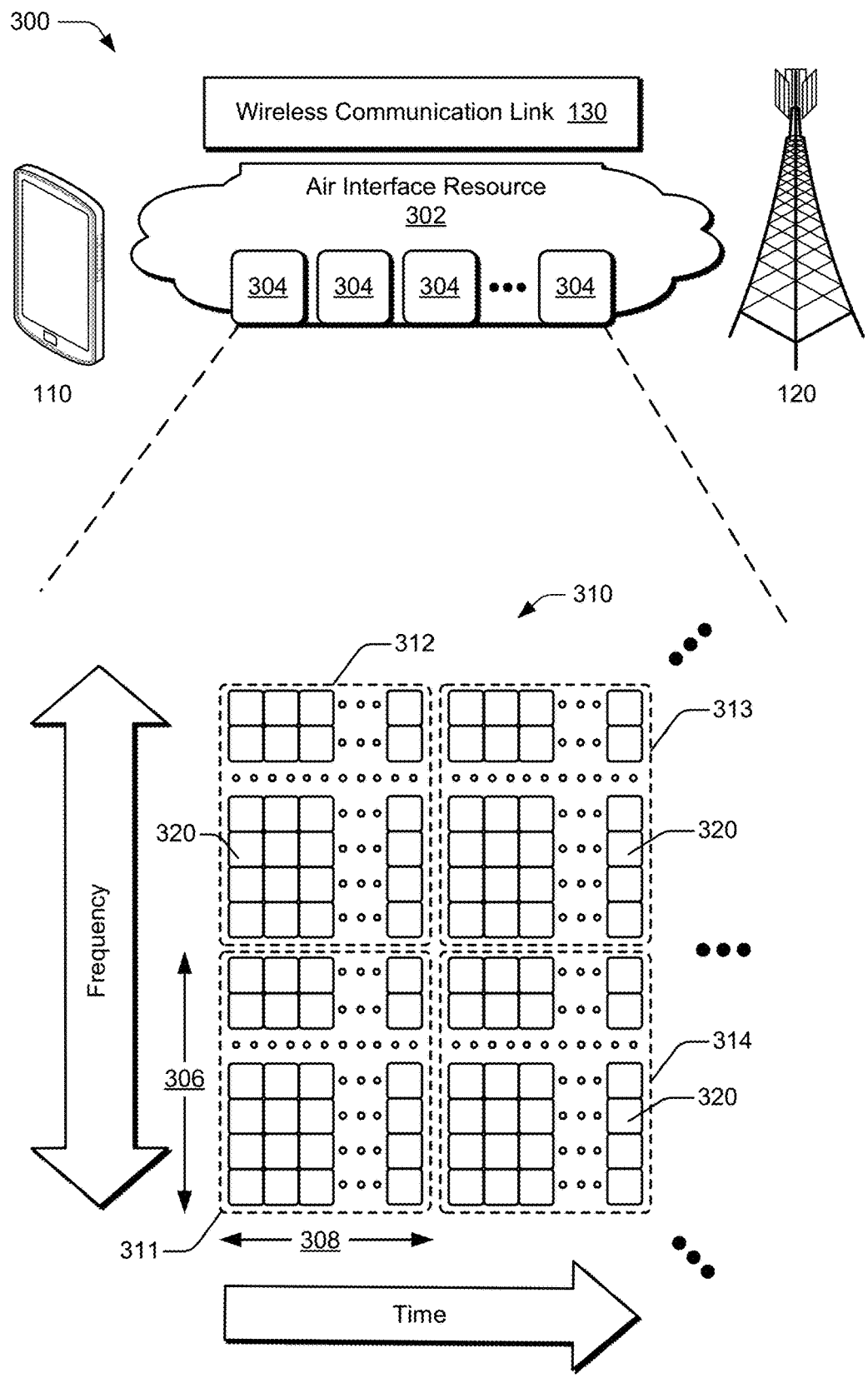
FIG. 3 illustrates an air interface resource that extends between a user equipment and a base station and with which various aspects of enhanced beam searching for an active coordination set techniques can be implemented.

FIG. 3 illustrates an air interface resource that extends between a user equipment and a base station and with which various aspects of enhanced beam searching for an active coordination set can be implemented. The air interface resource 302 can be divided into resource units 304, each of which occupies some intersection of frequency spectrum and elapsed time. A portion of the air interface resource 302 is illustrated graphically in a grid or matrix having multiple resource blocks 310, including example resource blocks 311, 312, 313, 314. An example of a resource unit 304 therefore includes at least one resource block 310. As shown, time is depicted along the horizontal dimension as the abscissa axis, and frequency is depicted along the vertical dimension as the ordinate axis. The air interface resource 302, as defined by a given communication protocol or standard, may span any suitable specified frequency range, and/or may be divided into intervals of any specified duration. Increments of time can correspond to, for example, milliseconds (mSec). Increments of frequency can correspond to, for example, megahertz (MHz).

In example operations generally, the base stations 120 allocate portions (e.g., resource units 304) of the air interface resource 302 for uplink and downlink communications. Each resource block 310 of network access resources may be allocated to support respective wireless communication links 130 of multiple user equipment 110. In the lower left corner of the grid, the resource block 311 may span, as defined by a given communication protocol, a specified frequency range 306 and comprise multiple subcarriers or frequency sub-bands. The resource block 311 may include any suitable number of subcarriers (e.g., 12) that each correspond to a respective portion (e.g., 15 kHz) of the specified frequency range 306 (e.g., 180 kHz). The resource block 311 may also span, as defined by the given communication protocol, a specified time interval 308 or time slot (e.g., lasting approximately one-half millisecond or seven orthogonal frequency-division multiplexing (OFDM) symbols). The time interval 308 includes subintervals that may each correspond to a symbol, such as an OFDM symbol. As shown in FIG. 3, each resource block 310 may include multiple resource elements 320 (REs) that correspond to, or are defined by, a sub carrier of the frequency range 306 and a subinterval (or symbol) of the time interval 308. Alternatively, a given resource element 320 may span more than one frequency subcarrier or symbol. Thus, a resource unit 304 may include at least one resource block 310, at least one resource element 320, and so forth.

In example implementations, multiple user equipment 110 (one of which is shown) are communicating with the base stations 120 (one of which is shown) through access provided by portions of the air interface resource 302. The base station manager 268 (shown in FIG. 2) may determine a respective data-rate, type of information, or amount of information (e.g., data or control information) to be communicated (e.g., transmitted) by the user equipment 110. For example, the base station manager 268 can determine that each user equipment 110 is to transmit at a different respective data rate or transmit a different respective amount of information. The base station manager 268 then allocates one or more resource blocks 310 to each user equipment 110 based on the determined data rate or amount of information.

Additionally, or in the alternative to block-level resource grants, the base station manager 268 may allocate resource units at an element-level. Thus, the base station manager 268 may allocate one or more resource elements 320 or individual subcarriers to different user equipment 110. By so doing, one resource block 310 can be allocated to facilitate network access for multiple user equipment 110. Accordingly, the base station manager 268 may allocate, at various granularities, one or up to all subcarriers or resource elements 320 of a resource block 310 to one user equipment 110 or divided across multiple user equipment 110, thereby enabling higher network utilization or increased spectrum efficiency.

The base station manager 268 can therefore allocate air interface resource 302 by resource unit 304, resource block 310, frequency carrier, time interval, resource element 320, frequency subcarrier, time subinterval, symbol, spreading code, some combination thereof, and so forth. Based on respective allocations of resource units 304, the base station manager 268 can transmit respective messages to the multiple user equipment 110 indicating the respective allocation of resource units 304 to each user equipment 110. Each message may enable a respective user equipment 110 to queue the information or configure the LTE transceiver 206, the 5G NR transceiver 208, and/or the 6G transceiver 210 to communicate via the allocated resource units 304 of the air interface resource 302.

Active Coordination Set

Figure 4:
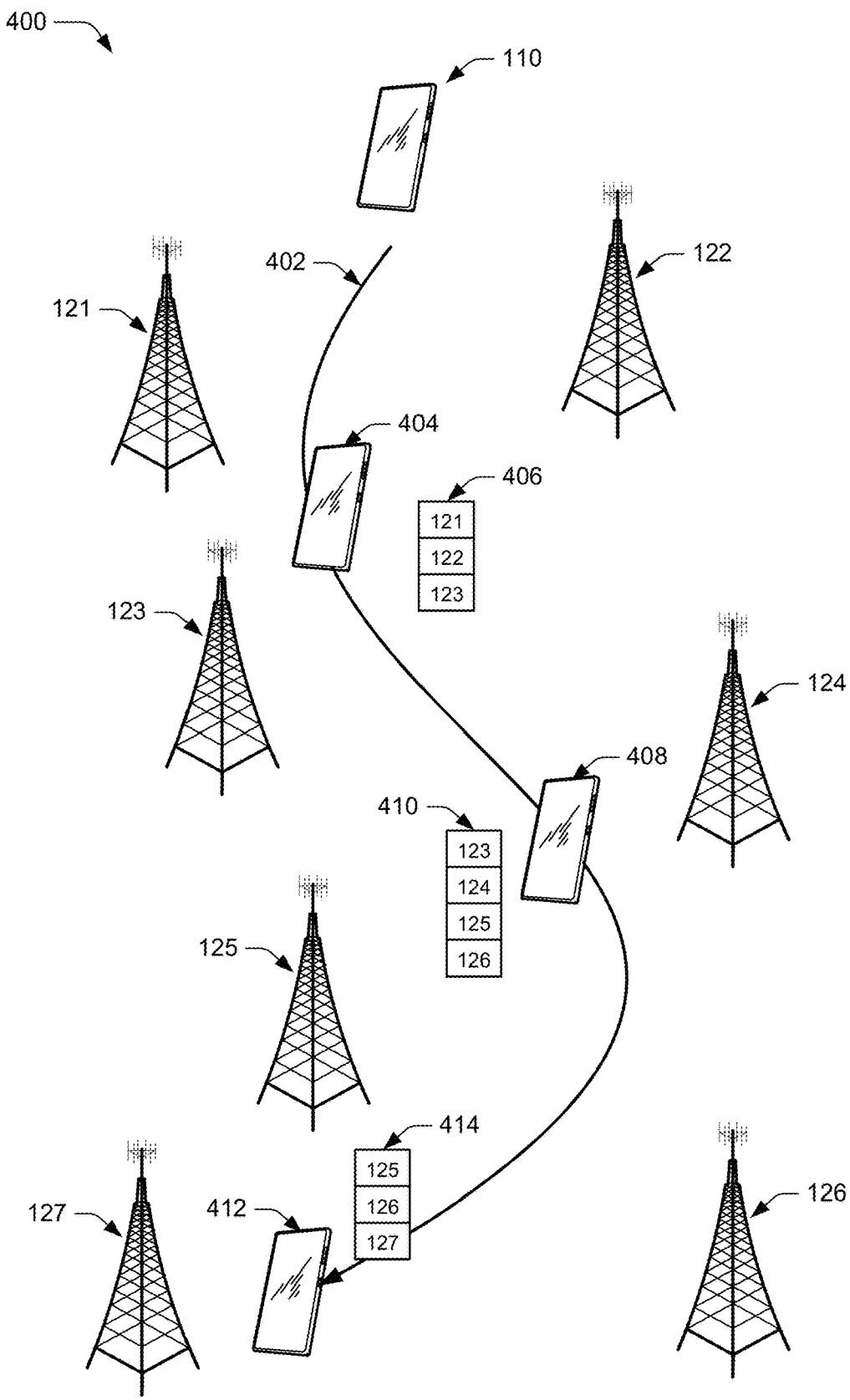
FIG. 4 illustrates an example of a user equipment moving through a radio access network that includes multiple base stations in accordance with aspects of enhanced beam searching for an active coordination set techniques.

FIG. 4 illustrates an example environment 400 in which a user equipment 110 is moving through a radio access network (RAN) that includes multiple base stations 120, illustrated as base stations 121-127. These base stations may utilize different technologies (e.g., LTE, 5G NR, 6G) at a variety of frequencies (e.g., sub-gigahertz, sub-6 GHz, and above 6 GHz bands and sub-bands).

For example, the user equipment 110 follows a path 402 through the RAN 140. The user equipment 110 periodically measures the link quality (e.g., of base stations that are currently in the ACS and candidate base stations that the UE 110 may add to the ACS. For example, at position 404, the ACS at 406 includes the base stations 121, 122, and 123. As the UE 110 continues to move, at position 408, the UE 110 has deleted base station 121 and base station 122 from the ACS and added base stations 124, 125, and 126, as shown at 410. Continuing along the path 402, the UE 110, at position 412, has deleted the base stations 123 and 124 and added the base station 127, as shown in the ACS at 414.

Figure 5:
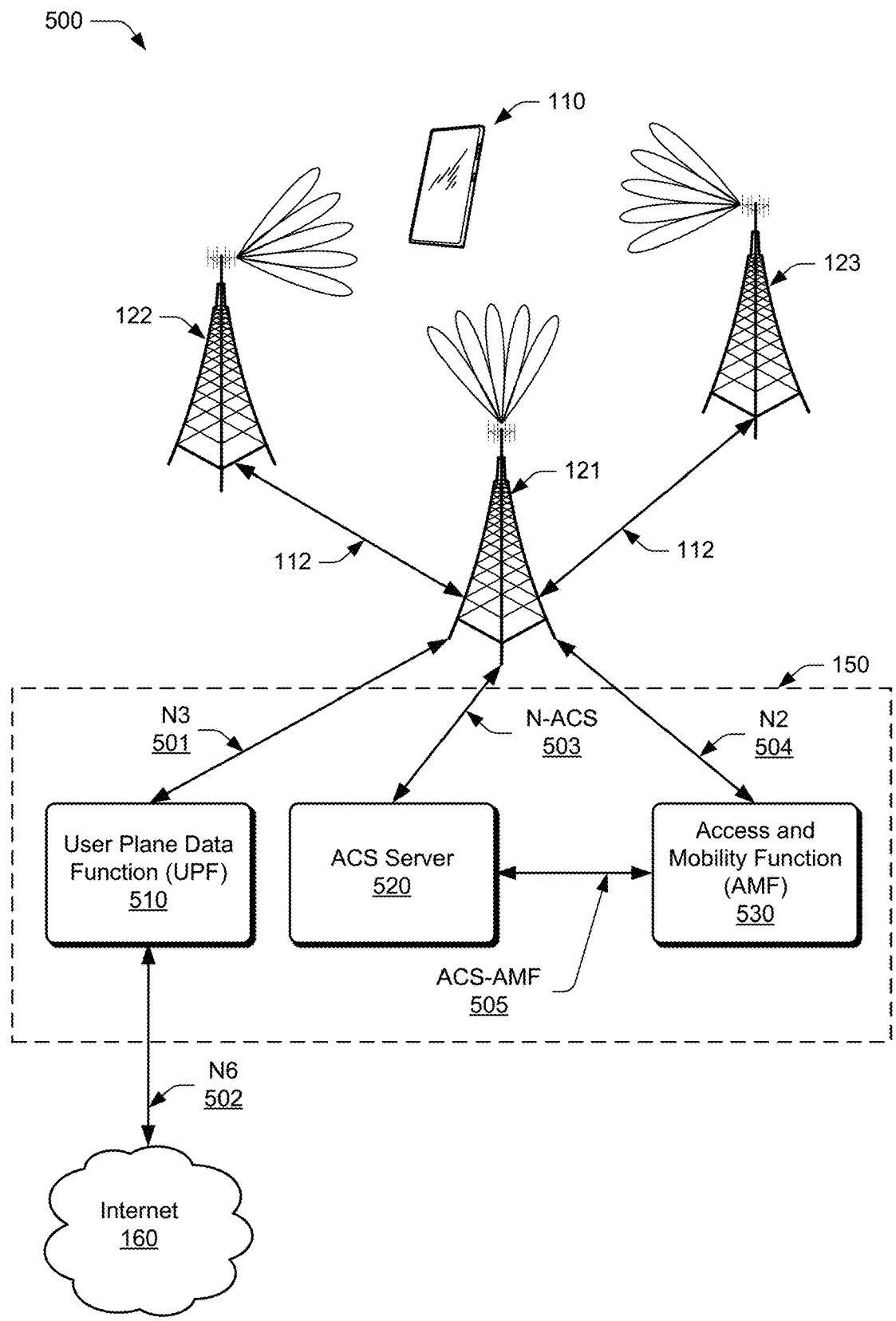
FIG. 5 illustrates an example environment in which various aspects of enhanced beam searching for an active coordination set can be implemented.

FIG. 5 illustrates an example environment 500 in which various aspects of enhanced beam searching for an active coordination set can be implemented. The user equipment 110 is engaged in joint transmission and/or reception (joint communication) with the three base stations 121, 122, and 123. The base station 121 is acting as a master base station for the joint transmission and/or reception. Which base station is the master base station is transparent to the UE 110, and the master base station can change as base stations are added and/or removed from the ACS. The master base station coordinates control-plane and user-plane communications for the joint communication with the UE 110 via the Xn interfaces 112 (or a similar 6G interface) to the base stations 122 and 123 and maintains the user-plane context between the UE 110 and the core network 150. The coordination may be performed using proprietary or standards-based messaging, procedures, and/or protocols.

The master base station schedules air interface resources for the joint communication for the UE 110 and the base stations 121, 122, and 123, based on the ACS associated with the UE 110. The master base station (base station 121) connects, via an N3 interface 501 (or a 6G equivalent interface), to the User Plane Function 510 (UPF 510) in the core network 150 for the communication of user plane data to and from the user equipment 110. The master base station distributes the user-plane data to all the base stations in the joint communication via the Xn interfaces 112. The UPF 510 is further connected to a data network, such as the Internet 160 via the N6 interface 502.

UE 110 downlink data can be sent from all of the base stations 120 in the ACS or any subset of the base stations 120 in the ACS. The master base station 121 determines which combination of base stations 120 in the ACS to use to transmit downlink data to the UE 110. The selection of base stations 120 to use to transmit downlink data can be based on one or more factors, such as application quality of service (QoS) requirements, location of the UE 110, velocity of the UE 110, a Reference Signal Received Power (RSRP), a Received Signal Strength Indicator (RSSI), interference, or the like. UE 110 uplink data can be received by all of the base stations 120 in the ACS or any subset of the base stations 120 in the ACS.

Similarly to downlink data, the master base station 121 determines which combination of base stations 120 in the ACS to use to receive uplink data from the UE 110. The selection of base stations 120 to use to receive uplink data can be based on one or more factors, such as application QoS requirements, location of the UE 110, velocity of the UE 110, RSRP, RSSI, interference, or the like. Typically, the combination of base stations 120 for downlink transmission and uplink reception will be identical, although different combinations of base stations 120 may be used for downlink transmission and uplink reception.

When the user equipment 110 creates or modifies an ACS, the user equipment 110 communicates the ACS or the ACS modification to an ACS Server 520 that stores the ACS for each user equipment 110 operating in the RAN 140. Although shown in the core network 150, alternatively the ACS Server 520 may be an application server located outside the core network 150. The user equipment 110 communicates the ACS or ACS modification via the master base station (base station 121) which is connected to the ACS Server 520 via an N-ACS interface 503. Optionally or alternatively, the user equipment 110 communicates the ACS or ACS modification to the ACS Server 520 via the Access and Mobility Function 530 (AMF 530) which is connected to the master base station (base station 121) via an N2 interface 504. The AMF 530 relays ACS-related communications to and from the ACS Server 520 via an ACS-AMF interface 505. ACS data between the user equipment 110 and the ACS Server 520 can be communicated via Radio Resource Control (RRC) communications, Non-Access Stratum (NAS) communications, or application-layer communications.

Enhanced Beam Searching for an Active Coordination Set

Figure 6:
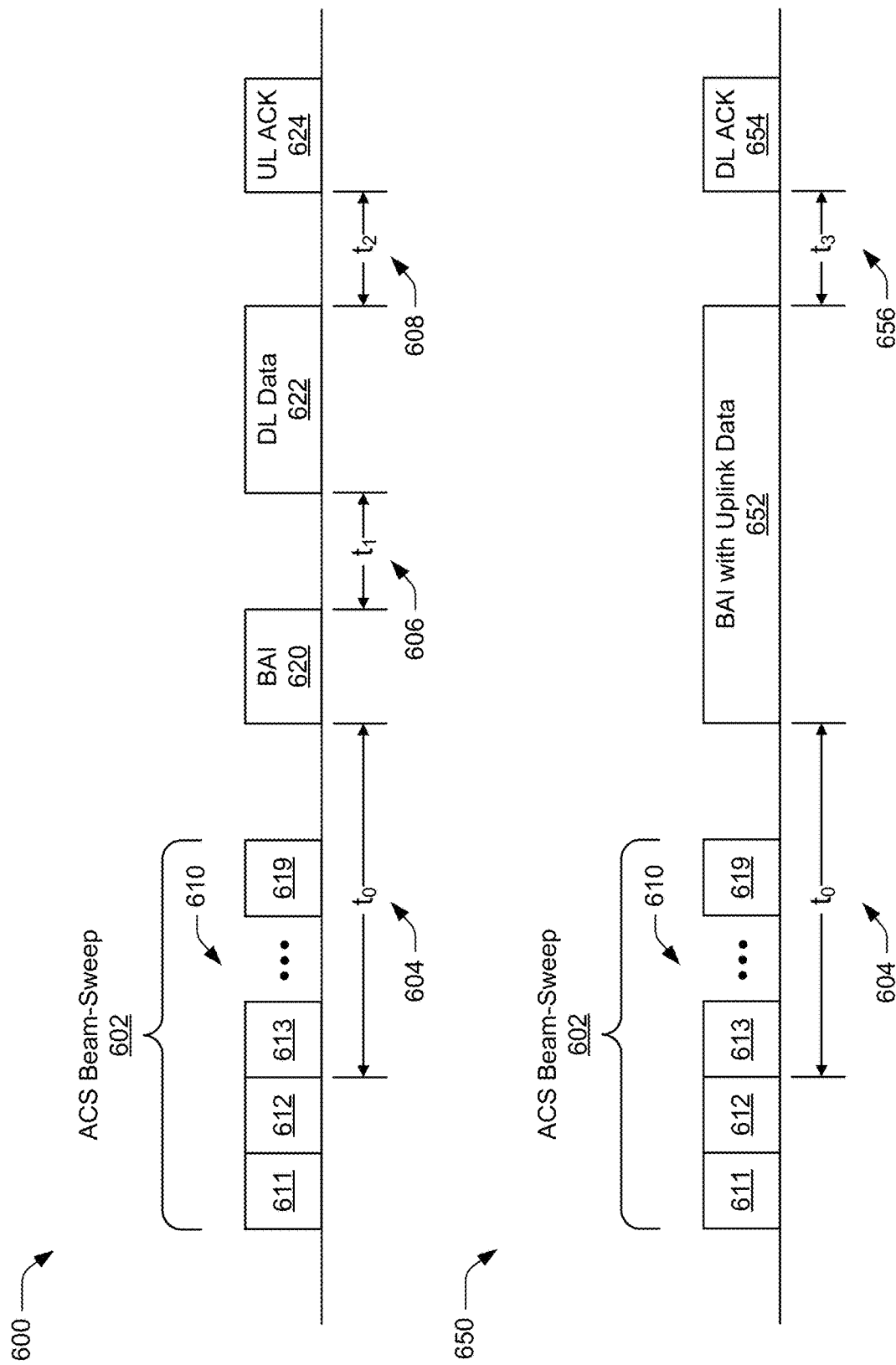
FIG. 6 illustrates example timing diagrams of beam searching between an active coordination set and a user equipment in accordance with aspects of enhanced beam searching for an active coordination set.

FIG. 6 illustrates example timing diagrams 600 and 650 of beam searching between an active coordination set and a user equipment in accordance with aspects of enhanced beam searching for an active coordination set. The timing diagram 600 illustrates beam searching for the transmission of downlink data to the UE, and the timing diagram 650 illustrates beam searching for the transmission of uplink data by the UE.

In an aspect, base stations in an ACS transmit an active-coordination-set beam-sweep 602 (ACS beam-sweep 602) on a downlink control channel. The ACS beam-sweep 602 includes multiple time slots 610 in which base stations in the ACS transmit candidate beams. The ACS beam-sweep 602 is illustrated as including the time slots 611, 612, and 613 through 619; however, ACS beam-sweep 602 can include any suitable number of time slots 610. Each candidate beam transmitted in a time slot 610 is individually decodable by the UE 110.

One or more base stations 120 in the ACS transmit each candidate beam in the ACS beam-sweep using a different beam and on the same frequency, such as the base stations 121, 122, and 123 as shown in FIG. 5. The master base station 121 determines which base stations in the ACS will transmit during the ACS beam-sweep 602, the frequency for the downlink control channel used for the ACS beam-sweep 602, and the configuration of the transmissions. The master base station 121 determines which base station or base stations will transmit during a given time slot 610 and the beam configuration transmitted by each base station. The master base station 121 coordinates the ACS beam-sweep using the Xn interfaces 112 (or a similar 6G interface) to the other base stations in the ACS (e.g., the base stations 122 and 123).

In alternative aspects, the master base station 121 can configure a single base station in the ACS to transmit candidate beams in each of the time slots 610 in the ACS beam-sweep 602; configure different base stations 120 in the ACS to transmit candidate beams in different time slots 610 in the ACS beam-sweep 602; or configure multiple base stations 120 in the ACS to concurrently transmit candidate beams in a single time slot 610, a portion of the time slots 610, or all of the time slots 610 in the ACS beam-sweep 602.

The master base station 121 configures the parameters of each candidate beam transmitted by each of the base stations. The master base station can specify the precoding matrix that each base station uses for each candidate beam transmitted by that base station. The master base station 121 can specify the transmit power for each of the candidate beams transmitted by each base station. The master base station 121 configures the reference signals used to transmit each candidate beam. For example, if the goal of the beam search is to support diversity reception or Coordinated Multipoint (CoMP) communication for the UE, the master base station 121 configures multiple base stations to each transmit a candidate beam in the same time slot 610 and using the same pilot signals (e.g., reference signals, pilot sequences, Demodulation Reference Signals (DM-RS)) to transmit the candidate beam. The master base station 121 can configure different base stations to transmit beam-sweeps with any suitable sweep direction (e.g., clockwise, counterclockwise), sweep speed, and starting at any suitable angular starting point.

For example, consider a beam-sweep for CoMP with joint transmission by three base stations. During the beam-sweep, the UE does not need to individually identify which of the three beams were received at the UE. The UE only needs to determine that whatever combination of one, two, or three beams it received in a time slot are satisfactory for uplink or downlink communication. The decision at the UE does not depend on which beams the UE received or did not receive. As such the UE does not need to differentiate the different beams based on pilot signals (e.g., reference signals, pilot sequences, Demodulation Reference Signals (DM-RS)). After receiving a beam-acquired indication (BAI) 620 of the selected beam(s) in a time slot based only on the reception of the a beam-acquired indication (BAI) 620 at a first time offset, all three base stations transmit downlink data regardless of whether a particular beam from a particular base station was received by the UE during the selected time slot or not.

The base station(s) in the ACS (e.g., the master base station 121) negotiates with the UE 110 to determine the configuration of the ACS beam-sweep 602. The negotiation configures the number of time slots 610 and/or the duration of the time slots 610 in the ACS beam-sweep 602. The negotiation includes the master base station providing an indication of the configuration (e.g., the precoding matrices, reference signals, or the like) for the UE 110 to use during the ACS beam-sweep. The ACS negotiates individually with each UE in order to consider the capabilities of each UE 110. For example, if the UE is capable of performing a receiver beam scan for each of the time slots 610, the negotiation can determine a duration for the time slots 610 to allow the UE 110 to perform the receiver beam scan during each time slot 610. The negotiation may be conducted using an omnidirectional beam or using an anchor carrier in a different frequency band than the band used for the ACS beam-sweep 602.

The UE 110 decodes the candidate beams to determine which candidate beam will be satisfactory for communication. The UE 110 can use any suitable link-quality metric to determine that a particular candidate beam will be satisfactory (e.g., a link-quality metric value that is greater than a threshold for a Received Signal Strength Indicator (RSSI), a Reference Signal Received Power (RSRP), or a Reference Signal Received Quality (RSRQ)). The UE 110 can evaluate the received candidate beams in all the time slots 610 to find the candidate beam (or set of candidate beams in a particular time slot) with the best link-quality metric before making a choice or the UE 110 can terminate evaluating the candidate beams when the first satisfactory candidate beam (or set of candidate beams in a particular time slot) is determined. For example, as illustrated in the timing diagram 600, the user equipment 110 selects the candidate beam (or set of candidate beams) transmitted in the time slot 612 for communication. The pilot signals in each beam of a set of candidate beams in a given time slot may be the same pilot signals or different pilot signals.

To indicate the selected candidate beam (e.g., the candidate beam transmitted in the time slot 612) for downlink data transmission, the UE 110 transmits a beam-acquired indication (BAI) 620 at a first time offset (to), 604 after the UE 110 received the selected candidate beam. Although the first time offset is shown as beginning at the end of the time slot 612 for the selected candidate beam, any suitable, fixed time offset can be used, such as the first time offset beginning at the start of the time slot 612. The base station(s) in the ACS that transmitted the ACS beam-sweep 602 configure a reciprocal receive beam corresponding to each of the one or more beams transmitted in the ACS beam-sweep 602 to receive the beam-acquired indication 620 at a time offset equal to the first time offset 604 for each of the candidate beams transmitted in the ACS beam-sweep 602.

Air interface resources for the BAI 620 are granted by the ACS (e.g., the master base station 121) and may be granted during the negotiation. The BAI 620 can be transmitted as a control-plane message or as one or more pilot symbols. The BAI 620 includes an identifier of the UE 110. The combination of the UE identifier and the timing of the BAI 620 indicates to the ACS which of the candidate beams transmitted during the ACS beam-sweep 602 to use to transmit the downlink data to the UE 110. The base stations in the ACS transmit the downlink data 622 using the selected candidate beam at second time offset ($t_1$) 606 after the ACS received the BAI 620. Optionally or additionally, the base stations in the ACS can further refine the selected beam for transmission of the downlink data. After receiving the downlink data, the UE 110 transmits an uplink acknowledgement 624 to the base stations in the ACS at a third time offset ($t_2$) 608 after the UE 110 receives the downlink data. The uplink acknowledgement can be an acknowledgement (ACK) if the UE 110 successfully decoded the downlink data or a negative acknowledgement (NACK) if the UE 110 unsuccessfully decoded the downlink data.

To select a beam for uplink data transmission, as illustrated in the timing diagram 650, the base stations in an ACS transmit the ACS beam-sweep 602 on a downlink control channel, as described above. An air-interface resource grant for the uplink communication may be included in the ACS beam-sweep 602, be communicated during the negotiation, or be transmitted separately to the UE 110. The UE 110 receives and decodes the candidate beams, as described above, and determines to use a candidate beam (or a set of candidate beams) transmitted in one of the time slots 610 for uplink communication. For example, the UE 110 decodes the candidate beam (or the set of candidate beams) transmitted in the time slot 612 and determines that the candidate beam transmitted in the time slot 612 will be satisfactory for uplink communication. To indicate the selected candidate beam for uplink data transmission, the UE 110 transmits a BAI with uplink data 652 at the first time offset (to) 604, after the UE 110 received the selected candidate beam. The UE 110 uses resources granted in a received resource grant to transmit the uplink data on the same physical channel or a different physical channel than the downlink control channel. After transmitting the uplink data, one or more base stations in the ACS transmit a downlink acknowledgement 654 to the UE 110 at a fourth time offset ($t_3$) at 656 after the base stations in the ACS receive the uplink data. The downlink acknowledgement can be an acknowledgement (ACK) if the one or more base stations in the ACS successfully decoded the uplink data or a negative acknowledgement (NACK) if the base stations in the ACS unsuccessfully decoded the uplink data.

The time offsets ($t_0$, $t_1$, $t_2$, and/or $t_3$) may be fixed time offsets, or a predetermined time offsets, or may be negotiated between the master base station and the UE as part of the negotiation of the configuration of the ACS beam-sweep 602. For example, during the negotiation, the values of the time offsets may be based upon the capabilities of the user equipment.

Example Methods

Example methods 700-1000 are described with reference to FIGS. 7-10 in accordance with one or more aspects of enhanced beam searching for an active coordination set. The order in which the method blocks are described are not intended to be construed as a limitation, and any number of the described method blocks can be skipped or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 7:
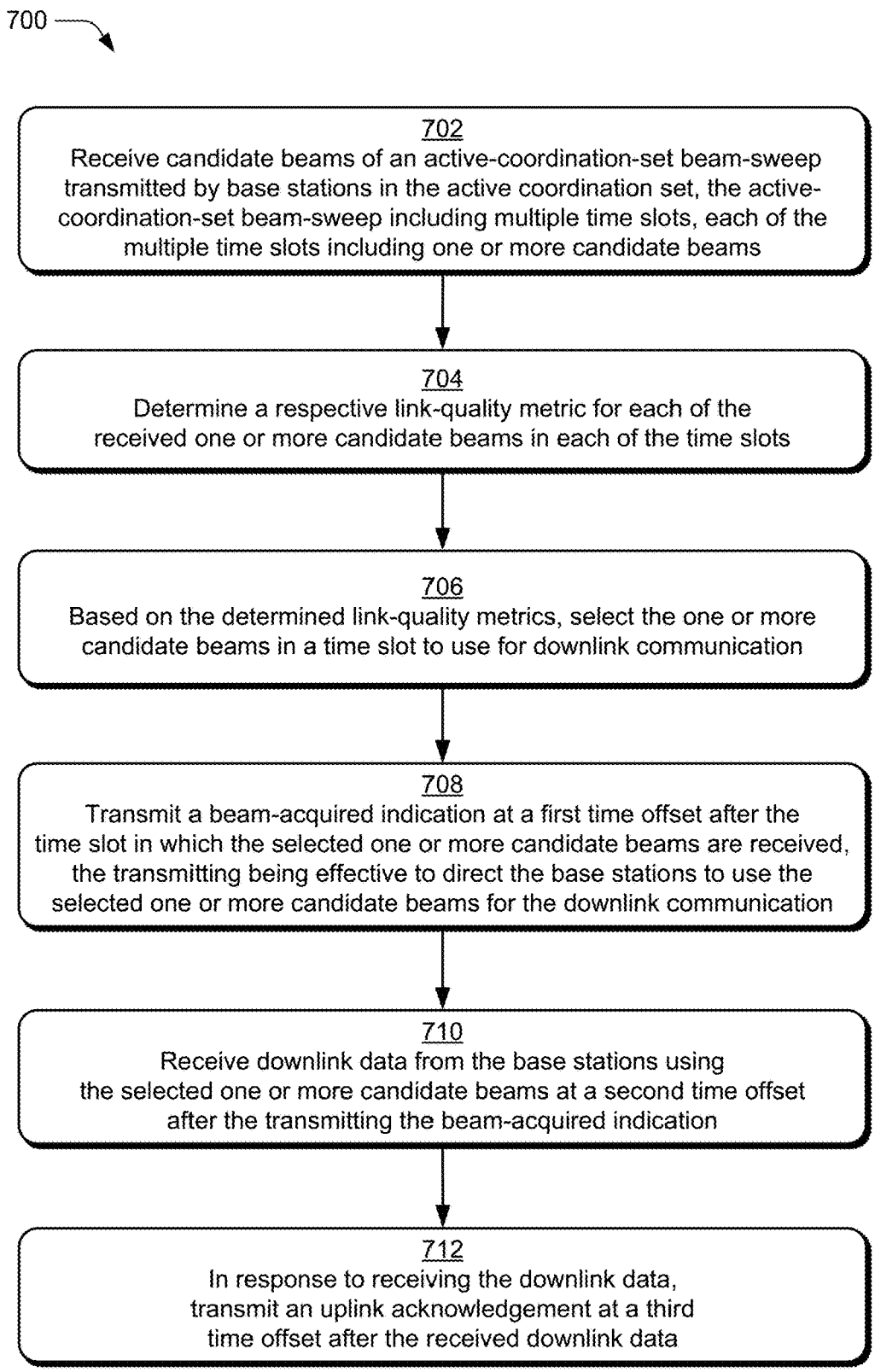
FIG. 7 illustrates an example method of enhanced beam searching for an active coordination set as generally related to a user equipment selecting a beam for downlink communication in accordance with aspects of enhanced beam searching for an active coordination set.

FIG. 7 illustrates example method(s) 700 of enhanced beam searching for an active coordination set as generally related to the user equipment 110 selecting a beam for downlink communication. At block 702, a user equipment receives candidate beams of an active-coordination-set beam-sweep transmitted by base stations in the active coordination set, the active-coordination-set beam-sweep including multiple time slots, each of the multiple time slots including one or more candidate beams. For example, a user equipment (e.g., the user equipment 110) receives candidate beams of an active-coordination-set beam-sweep (e.g., the ACS beam-sweep 602) from one or more base stations (e.g., the base stations 121, 122 and/or 123) in the active coordination set. The ACS beam-sweep includes multiple time slots, and each of the multiple time slots includes one or more candidate beams.

At block 704, the user equipment determines a respective link-quality metric for each of the received one or more candidate beams in each of the time slots. For example, the user equipment determines a respective link-quality metric, such as a Received Signal Strength Indicator (RSSI), a Reference Signal Received Power (RSRP), or a Reference Signal Received Quality (RSRQ) for each of the received one or more candidate beams in each of the time slots.

At block 706, based on the determined link-quality metrics, the user equipment selects the one or more candidate beams in a time slot to use for downlink communication. For example, based on the determined link-quality metrics, the user equipment selects the first one or more candidate beams in a time slot that has a link-quality metric greater than a minimum threshold value for the link-quality metric or the one or more candidate beams in a time slot that has the best value for the link-quality metric for the downlink communication.

At block 708, the user equipment transmits a beam-acquired indication at a first time offset after the time slot in which the selected one or more candidate beams are received, the transmitting being effective to direct the base stations to use the selected one or more candidate beams for the wireless communication. For example, the user equipment transmits a beam-acquired indication (e.g., a beam-acquired indication 620) at a first time offset (e.g., a first time offset 604) after the time slot in which the selected one or more candidate beams are received, the transmitting being effective to direct the base stations to use the selected one or more candidate beams for the wireless communication. The time at which the base stations receive the beam-acquired indication is used by the base stations to determine which one or more candidate beams are selected. The BAI may also include an identifier of the user equipment to indicate that the received BAI corresponds to the ACS beam-sweep transmitted to the user equipment.

At block 710, the user equipment receives downlink data from the base stations using the selected one or more candidate beams at a second time offset after the transmitting the beam-acquired indication. For example, the user equipment receives downlink data (e.g., the downlink data 622) from the base stations using the selected one or more candidate beams at a second time offset (e.g., a second time offset 606) after the transmitting the beam-acquired indication.

At block 712, in response to receiving the downlink data, the user equipment transmits an uplink acknowledgement at a third time offset after the received downlink data. For example, in response to receiving the downlink data, the user equipment transmits an uplink acknowledgement (e.g., an uplink acknowledgement 624) at a third time offset (e.g., a third time offset 608) after the received downlink data.

Figure 8:
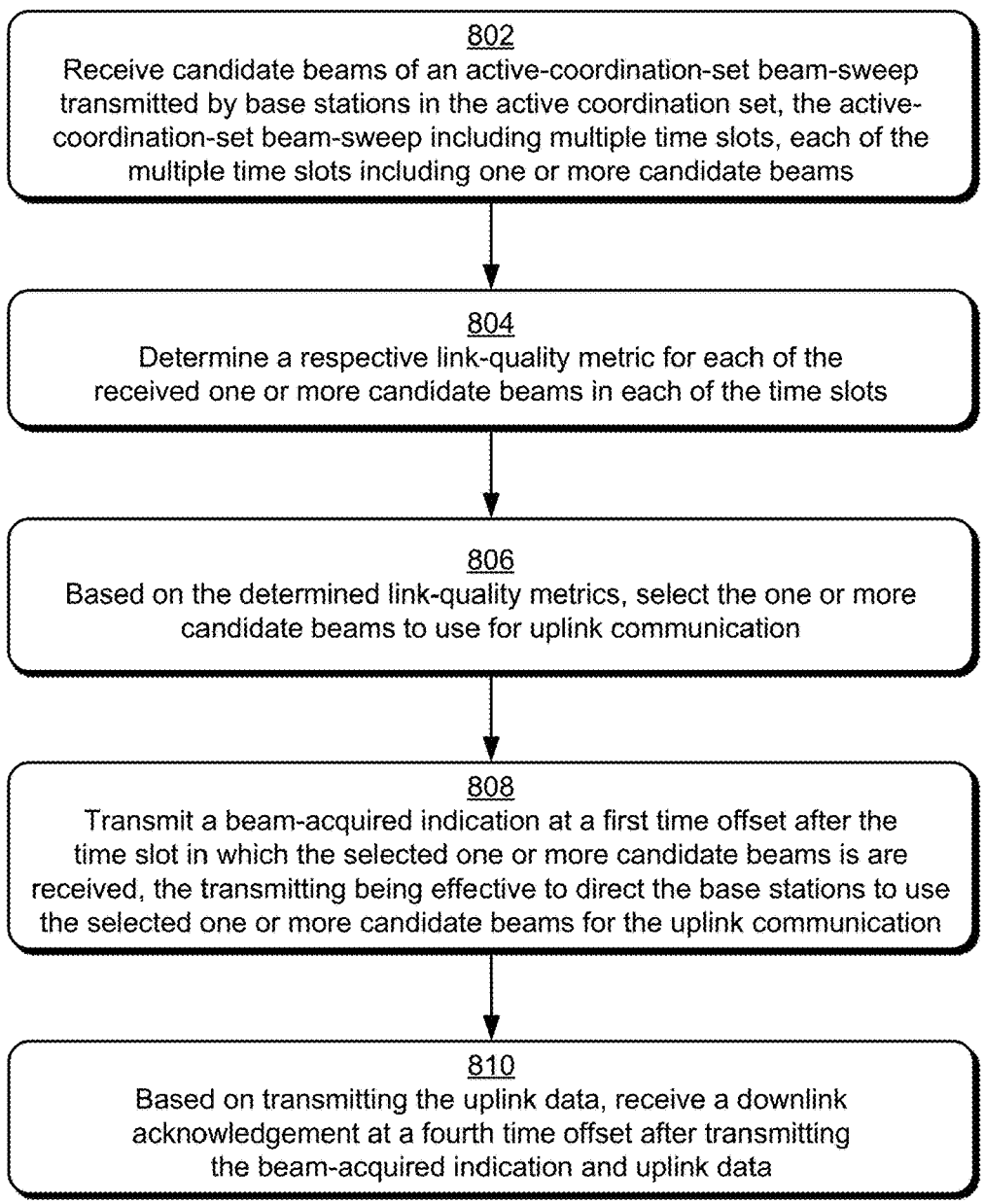
FIG. 8 illustrates an example method of enhanced beam searching for an active coordination set as generally related to a user equipment selecting a beam for uplink communication in accordance with aspects of enhanced beam searching for an active coordination set.

FIG. 8 illustrates example method(s) 800 of enhanced beam searching for an active coordination set as generally related to the user equipment 110 selecting a beam for uplink communication. At block 802, a user equipment receives candidate beams of an active-coordination-set beam-sweep transmitted by base stations in the active coordination set, the active-coordination-set beam-sweep including multiple time slots, each of the multiple time slots including one or more candidate beams. For example, a user equipment (e.g., the user equipment 110) receives candidate beams of an active-coordination-set beam-sweep (e.g., the ACS beam-sweep 602) from one or more base stations (e.g., the base stations 121, 122 and/or 123) in the active coordination set. The ACS beam-sweep includes multiple time slots, and each of the multiple time slots includes one or more candidate beams.

At block 804, the user equipment determines a respective link-quality metric for each of the received one or more candidate beams in each of the time slots. For example, the user equipment determines a respective link-quality metric, such as a Received Signal Strength Indicator (RSSI), a Reference Signal Received Power (RSRP), or a Reference Signal Received Quality (RSRQ) for each of the received one or more candidate beams in each of the time slots.

At block 806, based on the determined link-quality metrics, the user equipment selects the one or more candidate beams in a time slot to use for uplink communication. For example, based on the determined link-quality metrics, the user equipment selects the first one or more candidate beams in a time slot that has a link-quality metric greater than a minimum threshold value for the link-quality metric or the one or more candidate beams in a time slot that has the best value for the link-quality metric for the uplink communication.

At block 808, the user equipment transmits a beam-acquired indication and uplink data at a first time offset after the time slot in which the selected one or more candidate beams are received, the transmitting being effective to direct the base stations to use the selected candidate beam for the uplink communication. For example, the user equipment transmits a beam-acquired indication and uplink data (e.g., a beam-acquired indication with uplink data 652) at a first time offset (e.g., a first time offset 604) after the time slot in which the selected candidate beam is received to direct the base stations to use the selected candidate beam for the uplink communication. The time at which the base stations receive the beam-acquired indication is used by the base stations to determine which beam is selected. The BAI may also include an identifier of the user equipment to indicate that the received BAI corresponds to the ACS beam-sweep transmitted to the user equipment. The uplink data may be transmitted on the same channel as the BAI or a different channel.

At block 810, based on transmitting the uplink data, the user equipment receives a downlink acknowledgement at a fourth time offset after the transmitting the beam-acquired indication and uplink data. For example, based on transmitting the uplink data, the user equipment receives a downlink acknowledgement (e.g., a downlink acknowledgement 654) at a fourth time offset (e.g., a fourth time offset 656) after the transmitting the beam-acquired indication and uplink data.

Figure 9:
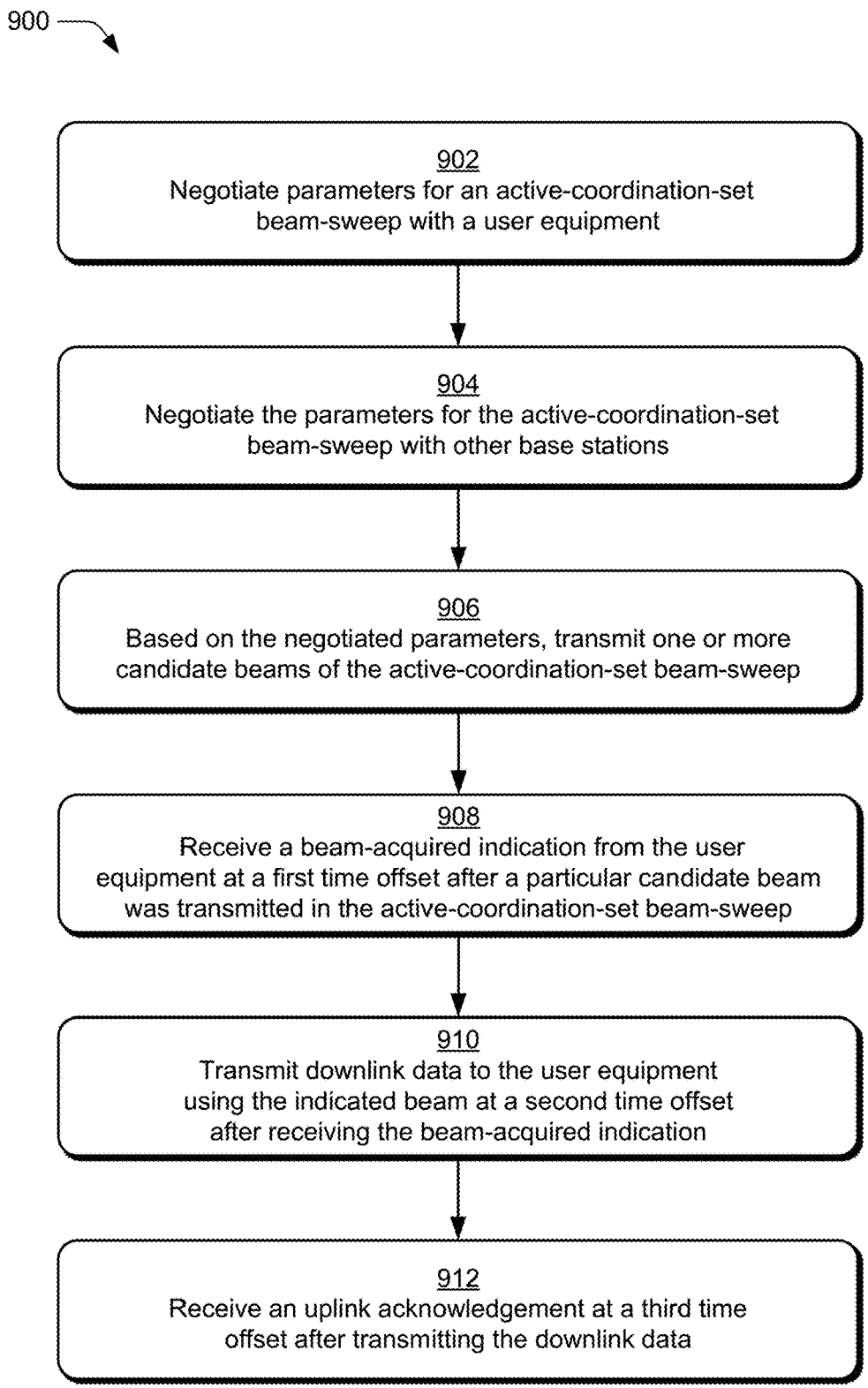
FIG. 9 illustrates an example method of enhanced beam searching for an active coordination set as generally related to a base station selecting a beam for downlink communication in accordance with aspects of enhanced beam searching for an active coordination set.

FIG. 9 illustrates example method(s) 900 of enhanced beam searching for an active coordination set as generally related to a base station selecting a beam for downlink communication. At block 902, a base station negotiates parameters for an active-coordination-set beam-sweep with a user equipment. For example, a base station (e.g., a master base station 121) negotiates parameters for an active-coordination-set beam-sweep (e.g., an ACS beam-sweep 602) with a user equipment (e.g., a user equipment 110). The negotiation may be conducted using an omnidirectional beam from the base station or using an anchor channel in a different frequency band.

At block 904, the base station negotiates the parameters for the active-coordination-set beam-sweep with other base stations. For example, the base station negotiates parameters for an active-coordination-set beam-sweep with other base stations (e.g., the base stations 122 and 123). The negotiation may be conducted using an Xn interface (e.g., the Xn interface 112) to coordinate air interfaces to use for the ACS beam-sweep, the timing of coordinated transmission of the ACS beam sweep, or the like.

At block 906, based on the negotiated parameters, the base station transmits one or more candidate beams of the active-coordination-set beam-sweep, using one or more associated beams, that direct the user equipment to select a beam for downlink communication. For example, the base station transmits one or more beam packets (e.g., beam packets 610) of the active-coordination-set beam-sweep, using one or more associated beams, that direct the user equipment to select a beam for downlink communication. The base station determines a duration of the beam packets based on capabilities of the user equipment determined during the negotiation. Additional base stations in the ACS may also transmit one or more beam packets during the active-coordination-set beam-sweep.

At block 908, the base station receives a beam-acquired indication from the user equipment at a first time offset after a particular candidate beam was transmitted in the active-coordination-set beam-sweep. For example, the base station receives a beam-acquired indication and uplink data (e.g., a beam-acquired indication 620) at a first time offset (e.g., a first time offset 604) after the one of the multiple beam packets (e.g., the beam packet 612) that indicates the selected beam for the downlink communication. The time at which the beam-acquired indication is received enables the base station to determine which beam is selected. The BAI may also include an identifier of the user equipment to indicate that the received BAI corresponds to the ACS beam-sweep transmitted to the user equipment.

At block 910, the base station transmits downlink data to the user equipment using the indicated beam at a second time offset after receiving the beam-acquired indication. For example, the base station transmits downlink data (e.g., downlink data 622) to the user equipment using the indicated beam at a second time offset (e.g., a second time offset 606) after receiving the beam-acquired indication.

At block 912, the base station receives an uplink acknowledgement at a third time offset after transmitting the downlink data. For example, the base station receives an uplink acknowledgement (e.g., an uplink acknowledgement 624) at a third time offset (e.g., a third time offset 606) after transmitting the downlink data.

Figure 10:
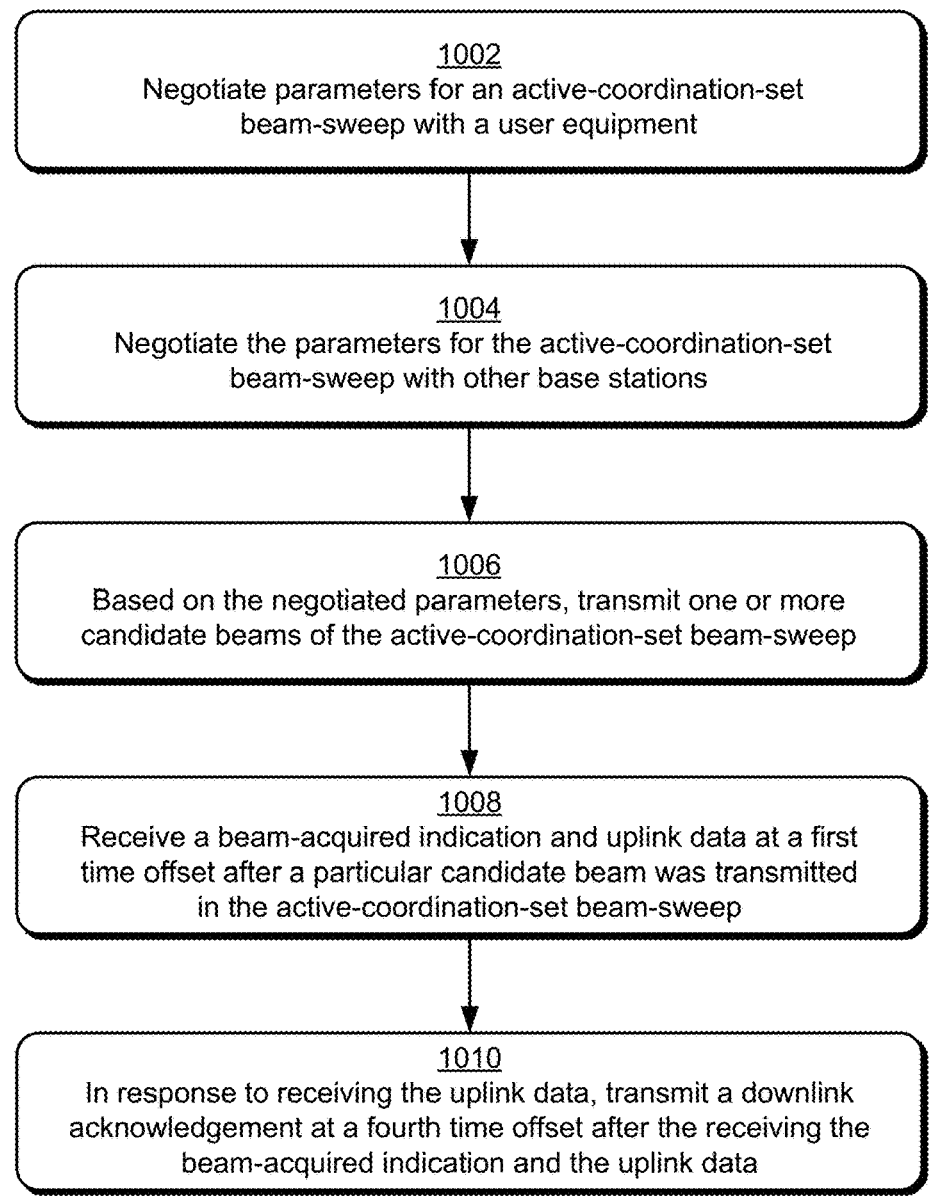
FIG. 10 illustrates an example method of enhanced beam searching for an active coordination set as generally related to a base station selecting a beam for uplink communication in accordance with aspects of enhanced beam searching for an active coordination set.

FIG. 10 illustrates example method(s) 1000 of enhanced beam searching for an active coordination set as generally related to a base station selecting a beam for uplink communication. At block 1002, a base station negotiates parameters for an active-coordination-set beam-sweep with a user equipment. For example, a base station (e.g., a master base station 121) negotiates parameters for an active-coordination-set beam-sweep (e.g., an ACS beam-sweep 602) with a user equipment (e.g., user equipment 110). The negotiation may be conducted using an omnidirectional beam from the base station or using an anchor channel in a different frequency band.

At block 1004, the base station negotiates the parameters for the active-coordination-set beam-sweep with other base stations. For example, the base station negotiates parameters for an active-coordination-set beam-sweep with other base stations (e.g., the base stations 122 and 123). The negotiation may be conducted using an Xn interface (e.g., the Xn interface 112) to coordinate air interfaces to use for the ACS beam-sweep, the timing of coordinated transmission of the ACS beam sweep, or the like.

At block 1006, based on the negotiated parameters, the base station transmits one or more candidate beams of the active-coordination-set beam-sweep. For example, the base station determines a duration of the time slots (e.g., time slots 610) in which the base station transmits the candidate beams based on capabilities of the user equipment determined during the negotiation. Additional base stations in the ACS may also transmit one or more candidate beams during the active-coordination-set beam-sweep as coordinated during the negotiation with the additional base stations.

At block 1008, the base station receives a beam-acquired indication and uplink data at a first time offset after a particular candidate beam was transmitted in the active-coordination-set beam-sweep. For example, the base station receives a beam-acquired indication and uplink data (e.g., a beam-acquired indication with uplink data 652) at a first time offset (e.g., a first time offset 604) after the selected candidate beam was transmitted that indicates the candidate beam the user equipment selected for the uplink communication. The BAI may also include an identifier of the user equipment to indicate that the received BAI corresponds to the ACS beam-sweep transmitted to the user equipment. The uplink data may be transmitted on the same channel as the BAI or a different channel.

At block 1010, in response to receiving the uplink data, the base station transmits a downlink acknowledgement at a fourth time offset after the receiving the beam-acquired indication and the uplink data. For example, the base station transmits downlink data to the user equipment using the indicated beam at a second time offset after the receiving the beam-acquired indication. For example, in response to receiving the uplink data, the base station transmits a downlink acknowledgement (e.g., a downlink acknowledgement 654) at a fourth time offset (e.g., a fourth time offset 656) after receiving the beam-acquired indication and the uplink data.

In the following text some examples are described—

Example 1: A method of selecting a beam for wireless communication in an active coordination set by a user equipment, the method comprising the user equipment:

receiving candidate beams of an active-coordination-set beam-sweep transmitted by base stations in the active coordination set, the active-coordination-set beam-sweep comprising multiple time slots, each of the multiple time slots comprising one or more candidate beams;

determining a respective link-quality metric for each of the received one or more candidate beams in each of the time slots;

based on the determined link-quality metrics, selecting the one or more candidate beams in a time slot to use for the wireless communication; and transmitting a beam-acquired indication at a first time offset after the time slot in which the selected one or more candidate beams are received, the transmitting being effective to direct the base stations to use the selected one or more candidate beams for the wireless communication.

Example 2: The method of example 1, wherein the wireless communication is a downlink communication, the method comprising the user equipment:
  receiving downlink data from one or more of the base stations using the selected one or more candidate beams at a second time offset after the transmitting the beam-acquired indication; and
  in response to receiving the downlink data, transmitting an uplink acknowledgement at a third time offset after the received downlink data.

Example 3: The method of example 1, wherein the wireless communication is an uplink communication, and wherein the transmitting the beam-acquired indication includes transmitting uplink data, the method comprising the user equipment:
  based on the transmitting the uplink data, receiving a downlink acknowledgement at a fourth time offset after the transmitting the beam-acquired indication.

Example 4: The method of any one of the preceding examples, wherein the link-quality metric is:
  a Received Signal Strength Indicator;
  a Reference Signal Received Power; or
  a Reference Signal Received Quality.

Example 5: The method of any one of the preceding examples, wherein the selecting the one or more candidate beams comprises the user equipment:
  selecting the one or more candidate beams in a first candidate beam time slot in which the one or more candidate beams that exceeds a threshold value for the link-quality metric.

Example 6: The method of any one of claims 1 to 4, wherein the selecting the candidate beam comprises the user equipment:
  selecting the one or more candidate beams in a time slot in which the one or more candidate beams have having the best link-quality metric of the candidate beams in any of the time slots.

Example 7: The method of any one of the preceding examples, the method further comprising the user equipment:
  negotiating parameters for the active-coordination-set beam-sweep with one or more base stations in the active coordination set.

Example 8: The method of example 7, wherein the negotiating the parameters for the active-coordination-set beam-sweep includes determining a duration of the time slots, and wherein the duration of the time slots is determined based upon one or more capabilities of the user equipment.

Example 9: The method of example 7, wherein the negotiating the parameters is conducted using an omnidirectional beam for communication between the base stations in the active coordination set and the user equipment.

Example 10: The method of example 7, wherein the negotiating the parameters is conducted using an anchor carrier for communication between the base stations in the active coordination set and the user equipment.

Example 11: The method of any one of the preceding examples, wherein the receiving the candidate beams comprises:
  receiving candidate beams during a particular time slot, each of the candidate beams including a different pilot sequence than the pilot sequence included in other candidate beams in the particular time slot.

Example 12: A user equipment comprising:
  a wireless transceiver;
  a processor; and
  instructions for an active coordination set manager that are executable by the processor to configure the user equipment to perform any one of examples 1 to 11.

Example 13: A method of selecting a beam for wireless communication in an active coordination set, the method comprising a base station:
  negotiating parameters for an active-coordination-set beam-sweep with a user equipment;
  negotiating the parameters for the active-coordination-set beam-sweep with other base stations in the active coordination set;
  based on the negotiating the parameters with the user equipment and the other base stations, transmitting one or more candidate beams of the active-coordination-set beam-sweep;
  receiving a beam-acquired indication from the user equipment at a first time offset after a particular candidate beam was transmitted in the transmitting the active-coordination-set beam-sweep; and
  based on the received beam-acquired indication, communicating with the user equipment using a beam indicated by the beam-acquired indication.

Example 14: The method of example 13, wherein the wireless communication is a downlink communication, the method comprising the base station:
  transmitting downlink data to the user equipment using the indicated beam at a second time offset after the receiving the beam-acquired indication; and
  in response to the transmitting the downlink data, receiving an uplink acknowledgement at a third time offset after the transmitting the downlink data.

Example 15: The method of example 13, wherein the wireless communication is an uplink communication, and wherein the receiving the beam-acquired indication includes receiving uplink data, the method comprising the base station:
  in response to receiving the uplink data, transmitting a downlink acknowledgement at a fourth time offset after the receiving the beam-acquired indication.

Example 16: The method of example 15, further comprising the base station:
  granting resources to the user equipment to transmit the uplink data.

Example 17: The method of any one of examples 13 to 16, further comprising the base station:
  using the first time offset to determine which of the one or more beams transmitted during the active-coordination-set beam-sweep to use for the communication with the user equipment.

Example 18: The method of any one of examples 13 to 17, wherein the receiving the beam-acquired indication comprises the base station:
  configuring a reciprocal receive beam corresponding to each of the one or more candidate beams transmitted in the active-coordination-set beam-sweep to enable the base station to receive the beam-acquired indication at a time offset equal to the first time offset for each of the candidate beams transmitted in the active-coordination-set beam-sweep.

Example 19: The method any one of examples 13 to 18, wherein the negotiating of the parameters for the active-coordination-set beam-sweep includes determining a duration of time slots in the active-coordination-set beam-sweep, and wherein the duration of the time slots is determined based upon one or more capabilities of the user equipment.

Example 20: The method of any one of examples 13 to 19, wherein the negotiation is conducted using an omnidirectional beam for communication between one or more base stations in the active coordination set and the user equipment.

Example 21: The method of any one of examples 13 to 20, wherein the negotiation is conducted using an anchor carrier for communication between one or more base stations in the active coordination set and the user equipment.

Example 22: A base station comprising:
  a wireless transceiver;
  a processor; and
  instructions for a base station manager that are executable by the processor to configure the base station to perform any one of methods 13 to 21.

Although aspects of enhanced beam searching for an active coordination set have been described in language specific to features and/or methods, the subject of the appended claims is not necessarily limited to the specific features or methods described. Rather, the specific features and methods are disclosed as example implementations of enhanced beam searching for an active coordination set, and other equivalent features and methods are intended to be within the scope of the appended claims. Further, various different aspects are described, and it is to be appreciated that each described aspect can be implemented independently or in connection with one or more other described aspects.

The invention claimed is:

1. A method of selecting, by a user equipment, a beam for wireless communication in an active coordination set comprising a plurality of base stations, the method comprising the user equipment:
  receiving candidate beams of an active-coordination-set beam-sweep transmitted by the base stations in the active coordination set, the active-coordination-set beam-sweep comprising multiple time slots, each of the multiple time slots comprising one or more candidate beams;
  determining a respective link-quality metric for each of the received one or more candidate beams in each of the time slots;
  based on the determined link-quality metrics, selecting the one or more candidate beams in a time slot to use for the wireless communication; and
  transmitting a beam-acquired indication at a first time predetermined offset after the time slot in which the selected one or more candidate beams are received, the transmitting being effective to direct the base stations to use the selected one or more candidate beams for the wireless communication, wherein the beam-acquired indication is effective to allow the base stations to determine which of the one or more candidate beams are selected based on the first predetermined time offset and a time at which the base stations receive the beam-acquired indication.

2. The method of claim 1, wherein the wireless communication is a downlink communication, the method comprising the user equipment:
  receiving downlink data from one or more of the base stations using the selected one or more candidate beams at a second time offset after the transmitting the beam-acquired indication; and
  in response to receiving the downlink data, transmitting an uplink acknowledgement at a third time offset after the received downlink data.

3. The method of claim 1, wherein the wireless communication is an uplink communication, and wherein the transmitting the beam-acquired indication includes transmitting uplink data, the method comprising the user equipment:
  based on the transmitting the uplink data, receiving a downlink acknowledgement at a fourth time offset after the transmitting the beam-acquired indication.

4. The method of claim 1, wherein the link-quality metric is:
  a Received Signal Strength Indicator;
  a Reference Signal Received Power; or
  a Reference Signal Received Quality.

5. The method of claim 1, wherein the selecting the one or more candidate beams comprises the user equipment:
  selecting the one or more candidate beams in a first time slot in which the one or more candidate beams exceeds a threshold value for the link-quality metric.

6. The method of claim 1, wherein the selecting the candidate beam comprises the user equipment:
  selecting the one or more candidate beams in a time slot in which the one or more candidate beams have the best link-quality metric of the candidate beams in any of the time slots.

7. The method of claim 1, the method further comprising the user equipment:
  negotiating parameters for the active-coordination-set beam-sweep with one or more base stations in the active coordination set.

8. The method of claim 7, wherein the negotiating the parameters for the active-coordination-set beam-sweep includes determining a duration of the time slots, and wherein the duration of the time slots is determined based upon one or more capabilities of the user equipment.

9. The method of claim 1, wherein the receiving the candidate beams comprises:
  receiving candidate beams during a particular time slot, each of the candidate beams including a different pilot sequence than the pilot sequence included in other candidate beams in the particular time slot.

10. A user equipment comprising:
  a wireless transceiver;
  a processor; and
  instructions for an active coordination set manager that are executable by the processor to configure the user equipment to:
    receive candidate beams of an active-coordination-set beam-sweep transmitted by base stations in the active coordination set, the active-coordination-set beam-sweep comprising multiple time slots, each of the multiple time slots comprising one or more candidate beams;
    determine a respective link-quality metric for each of the received one or more candidate beams in each of the time slots;
    based on the determined link-quality metrics, select the one or more candidate beams in a time slot to use for the wireless communication; and
    transmit a beam-acquired indication at a first predetermined time offset after the time slot in which the selected one or more candidate beams are received, the transmission being effective to direct the base stations to use the selected one or more candidate beams for the wireless communication, wherein the beam-acquired indication is effective to allow the base stations to determine which of the one or more candidate beams are selected based on the first predetermined time offset and a time at which the base stations receive the beam-acquired indication.

11. A method of selecting a beam for wireless communication in an active coordination set comprising a plurality of base stations, the method comprising a base station in the active coordination set:
negotiating parameters for an active-coordination-set beam-sweep with a user equipment;
negotiating the parameters for the active-coordination-set beam-sweep with other base stations in the active coordination set;
based on the negotiating the parameters with the user equipment and the other base stations, transmitting one or more candidate beams of the active-coordination-set beam-sweep;
receiving a beam-acquired indication from the user equipment at a first predetermined time offset after a particular candidate beam was transmitted in the active-coordination-set beam-sweep;
based on the first predetermined time offset and a time at which the base station receives the beam-acquired indication, determining which of the one or more candidate beams is selected; and
based on the determining, communicating with the user equipment using the selected candidate beam.

12. The method of claim 11, wherein the wireless communication is a downlink communication, the method comprising the base station:
transmitting downlink data to the user equipment using the indicated beam at a second time offset after the receiving the beam-acquired indication; and
in response to the transmitting the downlink data, receiving an uplink acknowledgement at a third time offset after the transmitting the downlink data.

13. The method of claim 11, wherein the wireless communication is an uplink communication, and wherein the receiving the beam-acquired indication includes receiving uplink data, the method comprising the base station:
in response to receiving the uplink data, transmitting a downlink acknowledgement at a fourth time offset after the receiving the beam-acquired indication.

14. The method of claim 13, further comprising the base station:
granting resources to the user equipment to transmit the uplink data.

15. The method of claim 11, further comprising the base station:
using the first time offset to determine which of the one or more beams transmitted during the active-coordination-set beam-sweep to use for the communication with the user equipment.

16. The method of claim 11, wherein the receiving the beam-acquired indication comprises the base station:
configuring a reciprocal receive beam corresponding to each of the one or more candidate beams transmitted in the active-coordination-set beam-sweep to enable the base station to receive the beam-acquired indication at a time offset equal to the first time offset for each of the candidate beams transmitted in the active-coordination-set beam-sweep.

17. The method of claim 11, wherein the negotiating of the parameters for the active-coordination-set beam-sweep includes determining a duration of time slots in the active-coordination-set beam-sweep, and wherein the duration of the time slots is determined based upon one or more capabilities of the user equipment.

18. The method of claim 11, wherein the negotiation is conducted using an omnidirectional beam for communication between one or more base stations in the active coordination set and the user equipment.

19. The method of claim 11, wherein the negotiation is conducted using an anchor carrier for communication between one or more base stations in the active coordination set and the user equipment.

20. A base station comprising:
a wireless transceiver;
a processor; and
instructions for a base station manager that are executable by the processor to configure the base station in an active coordination set to:
negotiate parameters for an active-coordination-set beam-sweep with a user equipment;
negotiate the parameters for the active-coordination-set beam-sweep with other base stations in the active coordination set;
based on the negotiation of the parameters with the user equipment and the other base stations, transmit one or more candidate beams of the active-coordination-set beam-sweep;
receive a beam-acquired indication from the user equipment at a first predetermined time offset after a particular candidate beam was transmitted in the active-coordination-set beam-sweep;
based on the first predetermined time offset and a time at which the base station receives the beam-acquired indication, determine which of the one or more candidate beams is selected; and
based on the determination, communicate with the user equipment using the selected candidate beam.

* * * * *